US 008521593B2

(12) United States Patent
Gadhia et al.

(10) Patent No.: US 8,521,593 B2
(45) Date of Patent: Aug. 27, 2013

(54) METHODS AND SYSTEMS FOR PROVIDING MOBILE ADVERTISING USING DATA NETWORKS BASED ON GROUPINGS ASSOCIATED WITH INTERNET-CONNECTABLE DEVICES

(75) Inventors: Hemang N. Gadhia, Arlington, VA (US); Rishi Kumar, Laurel, MD (US); Hellmut Adolphs, Washington, DC (US); Matthew M. Saunders, Alexandria, VA (US)

(73) Assignee: Millennial Media, Inc., Baltimore, MD (US)

( * ) Notice: Subject to any disclaimer, the term of this patent is extended or adjusted under 35 U.S.C. 154(b) by 0 days.

(21) Appl. No.: 13/605,613

(22) Filed: Sep. 6, 2012

(65) Prior Publication Data

US 2013/0060639 A1 Mar. 7, 2013

Related U.S. Application Data

(60) Provisional application No. 61/531,890, filed on Sep. 7, 2011, provisional application No. 61/570,385, filed on Dec. 14, 2011.

(51) Int. Cl.
*G06Q 30/00* (2012.01)
(52) U.S. Cl.
USPC .................. 705/14.58; 705/14.49; 705/14.53; 705/14.66
(58) Field of Classification Search
USPC ........................................... 705/14.58, 14.64
See application file for complete search history.

(56) References Cited

U.S. PATENT DOCUMENTS

| 6,123,259 | A * | 9/2000 | Ogasawara .................... 235/380 |
| 6,768,994 | B1 * | 7/2004 | Howard et al. ........................ 1/1 |
| 2002/0111172 | A1 | 8/2002 | Dewolf et al. |
| 2003/0105667 | A1 | 6/2003 | Millikan |
| 2007/0244750 | A1 * | 10/2007 | Grannan et al. ................. 705/14 |
| 2007/0260741 | A1 | 11/2007 | Bezancon |
| 2008/0312946 | A1 * | 12/2008 | Valentine et al. ................. 705/1 |
| 2010/0159943 | A1 | 6/2010 | Salmon |

OTHER PUBLICATIONS

Font et al., "Mobile robot localization: revisiting the triangulation methods", Proceedings of the IFAC Symposium on Robot Control, International Federation of Automatic Control, Bologna, 2006.*
Damien, "Web site vs web application in Visual Studio", DamienG Blog, Feb. 7, 2008, found on line at damieng.com/blog/2008/02/07/web-site-vs-web-application.*

(Continued)

*Primary Examiner* — John G Weiss
*Assistant Examiner* — Scott C Anderson
(74) *Attorney, Agent, or Firm* — Finnegan, Henderson, Farabow, Garrett & Dunner, LLP

(57) ABSTRACT

Computer systems and methods for providing mobile advertising using data networks based on groupings associated with Internet-connectable devices are disclosed. In some embodiments, the computer systems and methods may comprise receiving and/or retrieving events; grouping the events into an events group; determining an audience value for a user of the Internet-connectable device based on the events group, wherein the audience value represents an audience segment comprising a subgroup of Internet-connectable device users defined based on at least one criterion; and transmitting an advertisement to the Internet-connectable device, wherein the advertisement is determined based on the audience value.

22 Claims, 10 Drawing Sheets

(56) References Cited

OTHER PUBLICATIONS

Leonard et al., "Use Characteristics of the Great Gulf Wilderness", Forest Service Research Paper NE-428, Forest Service, U.S. Department of Agriculture, 1978, found on line at www.fs.fed.us/ne/newtown_square/publications/research_papers/pdfs/scanned/OCR/ne_rp428.pdf.*

International Search Report and Written Opinion issued in International Patent Application No. PCT/US12/53829, 12 pages; date of mailing Jan. 7, 2013.

PCT Recordation of Search History; 4 pages.

* cited by examiner

Example Generic Audience Value Rule Model

DATA INPUTS & WEIGHTS

Category-Based Parameters
taxonomyID=t1; weight=w3
taxonomyID=t2; weight=w4
taxonomyID=t3; weight=w5

Related Audience Value-Based Parameters
name=av1; weight=w13
name=av2; weight=w14

Interaction-Based Parameters
interactionTypeID=impression; weight=w9
interactionTypeID=click; weight=w10
interactionTypeID=conversion; weight=w11
interactionTypeID=location; weight=w12

METRICS

Probability Metrics
name="stop/place confidence"; mean; standard deviation
name="publisher confidence"; mean; standard deviation
name=av1; mean; standard deviation
name=av2; mean; standard deviation

SCORE & CONFIDENCE VALUES reference value = (# t1 * w3) + (# t2 * w4) + (# t3 * w5) + (# impression * w9) + (# click * w10) + (# conversion * w11) + (# location * w12) + (av1 * w13) + (av2 * w14)

confidence = cumulative probability ("stop/place confidence", "publisher confidence", "av1", "av2")

FIG. 8

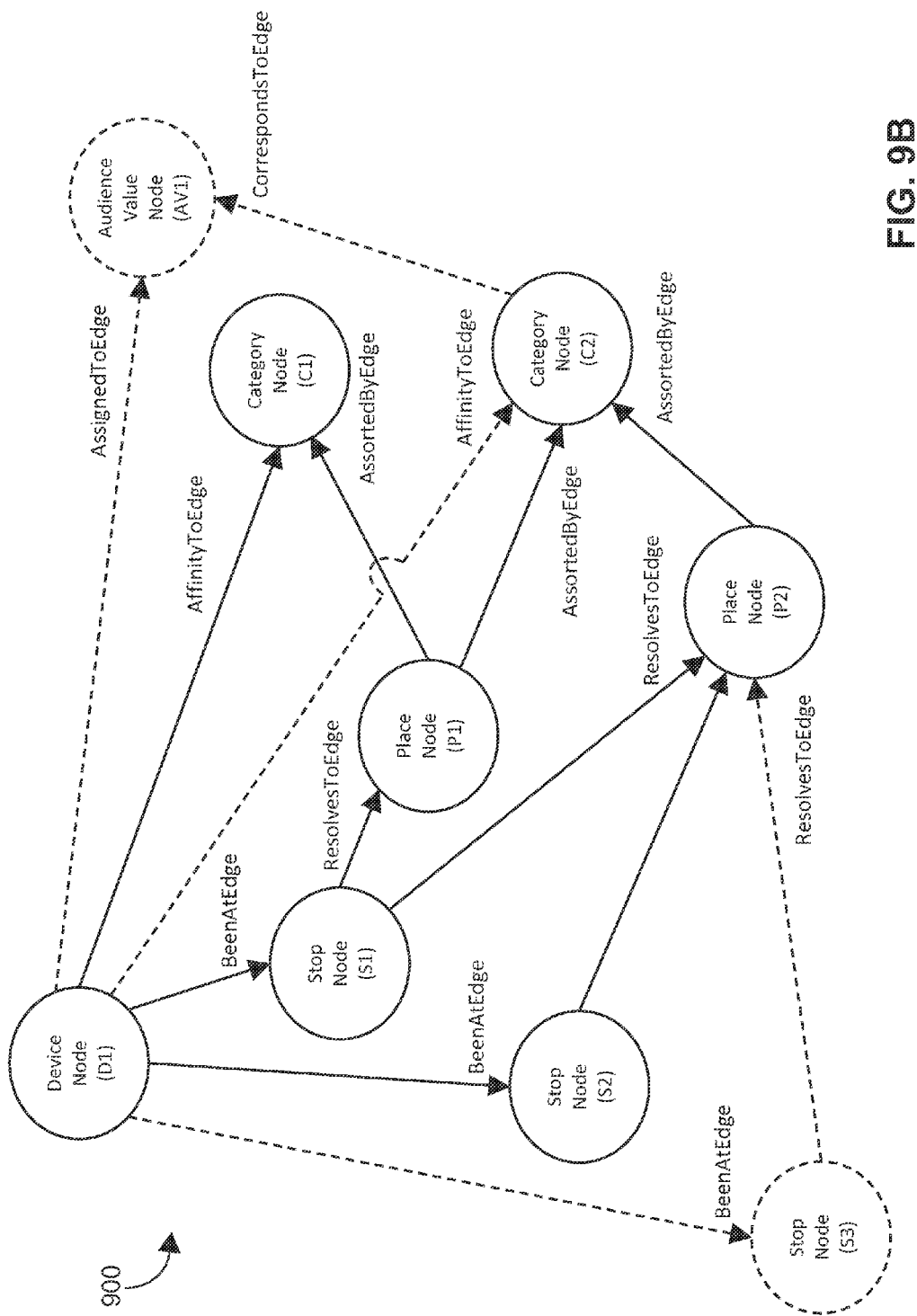

METHODS AND SYSTEMS FOR PROVIDING MOBILE ADVERTISING USING DATA NETWORKS BASED ON GROUPINGS ASSOCIATED WITH INTERNET-CONNECTABLE DEVICES

RELATED APPLICATIONS

This application claims the benefit of U.S. Provisional Application No. 61/531,890, filed Sep. 7, 2011, and U.S. Provisional Application No. 61/570,385, filed Dec. 14, 2011, both of which are hereby incorporated by reference herein.

This application also hereby incorporates by reference herein U.S. Non-Provisional patent application Ser. No. 13/605,393, entitled METHODS AND SYSTEMS FOR PROVIDING MOBILE ADVERTISING USING DATA NETWORKS BASED ON INTELLIGENCE DATA ASSOCIATED WITH INTERNET-CONNECTABLE DEVICES, U.S. Non-Provisional patent application Ser. No. 13/605,495, entitled METHODS AND SYSTEMS FOR PROVIDING MOBILE ADVERTISING USING DATA NETWORKS BASED ON INTELLIGENCE DATA ASSOCIATED WITH INTERNET-CONNECTABLE DEVICES DERIVED USING GRAPH DATA MODELS, U.S. Non-Provisional patent application Ser. No. 13/605,559, entitled METHODS AND SYSTEMS FOR CAPTURING AND TRANSMITTING LOCATIONS EVENTS DATA USING DATA NETWORKS, U.S. Non-Provisional patent application Ser. 13/605,641, entitled METHODS AND SYSTEMS FOR PERFORMING PROXIMITY-BASED TARGETING OF ADVERTISEMENTS TO INTERNET-CONNECTABLE DEVICES AND UTILIZING PREDICTED LOCATIONS OF INTERNET-CONNECTABLE DEVICES USING DATA NETWORKS, all filed concurrently herewith.

TECHNICAL FIELD

The systems and techniques described herein relate generally to methods and systems for providing mobile advertising using data networks based on groupings associated with Internet-connectable devices.

BACKGROUND

Internet-connectable devices are ubiquitous in today's society. This is evidenced by the widespread use of personal electronic user devices, such as smartphones. In part, this is due to advancements in mobile network infrastructure, service offerings from multiple mobile network operators that give greater value to subscribers, reduced device manufacturing costs, and the fact that today's mobile devices can serve many functions beyond voice communication. For example, certain mobile devices may function as a mobile phone, a video camera, a portable media player, a Global Positioning System (GPS) device, and/or an internet client with email and web browsing capabilities. Certain mobile devices may also provide proprietary and/or third-party software applications that offer various capabilities including, for example, games and social networking. Such devices may also be used to conduct transactions such as, for example, commercial transactions. Other internet-connectable devices may provide the same or similar functions and capabilities due to similar advancements and offerings.

Advertisers have responded to the influx of powerful and intelligent Internet-connected devices by increasingly marketing products and services via mobile advertising. Mobile advertising is a rapidly growing sector providing advertisers with the opportunity to connect with potential consumers via consumers' Internet-connectable devices, rather than, or in addition to, traditional media such as radio or television. Mobile advertising includes many channels through which consumers can be reached. These channels include, but are not limited to, web-browser clients, Short Message Service (SMS), Multimedia Messaging Service (MMS), games, videos, and software applications. Each mobile advertisement can link to additional content, channels, software applications or, in some instances, complementing media.

Internet-connectable devices are ideal for targeted advertisements due to the fact that an Internet-connectable device is often associated with only one unique user. Moreover, many Internet-connectable devices give users the ability to be highly engaged with the content available thereon, including advertisements. Therefore, Internet-connectable devices can help deliver excellent advertisement campaign effectiveness and response levels compared to other media; however, to be most effective, advertisements must be relevant to the user of the Internet-connectable device. For example, people without children are unlikely to be interested in advertisements for diapers. Thus, to provide relevant advertisements, advertisers may require some information about the user to help identify unique interests and attributes of the user.

Typically, to determine a relevant advertisement for a user of an Internet-connectable device, device-specific data can be communicated from the Internet-connectable device to a publisher server in the form of, for example, metadata. This, in turn, may be passed on to an advertising server or other server for advertisement analysis and decision-making. In addition to the device-specific parameters, a publisher server may store additional information useful in determining a relevant advertisement for a user including, for example, profile data, which may comprise anonymous unique user attributes such as gender, location, age, other demographic characteristics, user affinities, interests, user and/or device history and characteristics, purchase intent, etc.

SUMMARY

Computer systems and methods for providing mobile advertising using data networks based on groupings associated with Internet-connectable devices are disclosed. In some embodiments, the computer systems and methods may comprise receiving and/or retrieving events; grouping the events into an events group; determining an audience value for a user of the Internet-connectable device based on the events group, wherein the audience value represents an audience segment comprising a subgroup of Internet-connectable device users defined based on at least one criterion; and transmitting an advertisement to the Internet-connectable device, wherein the advertisement is determined based on the audience value.

BRIEF DESCRIPTION OF THE DRAWINGS

The accompanying drawings, which are incorporated in and constitute a part of this specification, illustrate various embodiments of the systems and techniques, as described herein, and together with the description, serve to explain the principles of the systems and techniques. In the drawings:

FIG. 8 illustrates a generic audience value rule model that may be used with certain embodiments of the systems and techniques described herein;

FIG. 9B illustrates a graph data model that may be used with certain embodiments of the systems and techniques described herein.

DETAILED DESCRIPTION

Described herein are systems and techniques for providing mobile advertising using data networks based on groupings associated with Internet-connectable devices. In some embodiments of the disclosed systems and techniques, audience values, which may be used to perform targeted advertising, may be determined based on one or more groupings of location events data and/or network events data associated with Internet-connectable devices. In certain embodiments, audience values may be more reliably and confidently determined based on such groupings. In a specific embodiment, audience values may be determined based on routine places and travel associated with users of Internet-connectable devices derived from data groupings.

Reference will now be made to accompanying figures. Occasionally, the same reference numbers may be used throughout the figures and the following description to refer to the same or similar parts. While several embodiments and features of the techniques are described herein, modifications, adaptations, and other implementations are possible, without departing from the spirit and scope of the techniques. For example, substitutions, additions, or modifications may be made to the components illustrated in the figures, and the methods described herein may be modified by substituting, reordering, or adding steps to the disclosed methods. Accordingly, the following detailed description is not intended to limit the techniques to any specific embodiments or examples.

Figure 1:
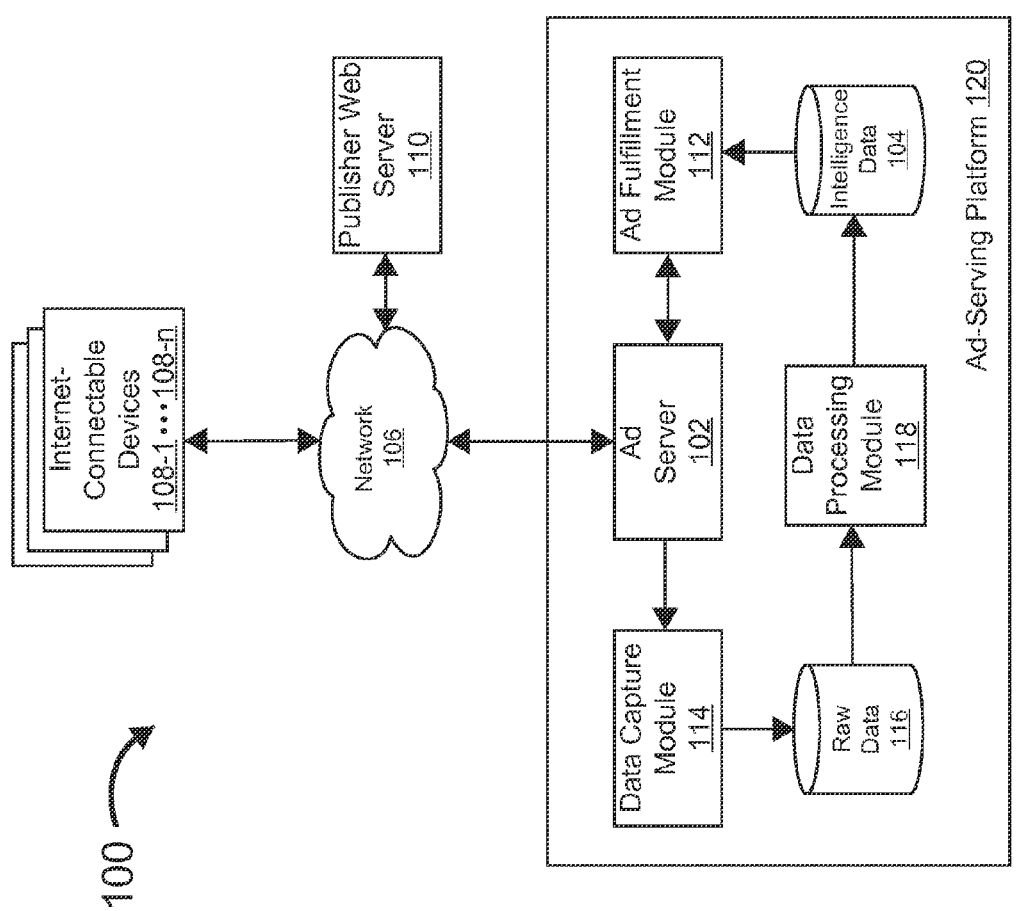
FIG. 1 illustrates a system that may be used with certain embodiments of the systems and techniques described herein.

FIG. 1 shows a block diagram of a system 100 that may be used with certain embodiments of the systems and techniques described herein. As shown in the embodiment of FIG. 1, system 100 may include, for example, an ad-serving platform 120, Internet-connectable devices 108-1 through 108-*n*, and a publisher web server 110. Ad-serving platform 120, Internet-connectable devices 108, and publisher web server 110 may communicate through a network 106. Network 106 may be any one or more of a variety of networks or other types of communication connections known to those skilled in the art. Network 106 may include a network connection, bus, or other type of data link, such as a hardwire or other connection known in the art. For example, network 106 may be the Internet, an intranet network, a local area network, or other wireless or other hardwired connection or connections by which ad-serving platform 120, Internet-connectable devices 108, and publisher web server 110 may communicate.

Internet-connectable devices 108 may be, include, or be part of any entity that is capable of presenting advertisements to one or more users. In many embodiments, an Internet-connectable device may be identifiable as a device uniquely associated with a user. For example, Internet-connectable device 108-1 may be a personal computer with Internet access that is uniquely identifiable by an Internet Protocol (IP) address or by an Internet cookie stored on the personal computer. Internet-connectable device 108-2 may be a smartphone that is uniquely identifiable by, for example, an International Mobile Equipment Identity number. Other Internet-connectable devices may include, for example, television set-top boxes, tablet computers, portable media devices, appliances, websites, and gaming consoles.

Publisher web server 110 may be owned and/or operated by, for example, a publisher, or other content provider, and may be, include, or be part of a technology and service that provides webpages or other content to requesting entities such as, for example, Internet-connectable devices 108. In various embodiments, publisher web server 110 may include, for example, a general purpose computer, a server, a mainframe computer, a computer with a specific purpose of determining and delivering content to Internet-connectable devices 108, or a combination of one or more thereof. Content may be provided as HyperText Markup Language (HTML), Extensible Markup Language (XML), ADOBE FLASH, or any other type of data, or combination of data and formatting structure, that may be used to deliver content to Internet-connectable devices 108. Webpages may include images, videos, text, advertisements, or other content that is suitable for the World Wide Web and can be displayed via a web browser on Internet-connectable devices 108. Similar content may be provided by publisher web server 110 for display via one or more other means such as, for example, applications running on Internet-connectable devices 108.

Publishers may seek to generate revenue by selling advertisement space, also known as inventory, to advertisers. In some cases, publishers directly sell advertisement inventory to advertisers. In other cases, publishers indirectly sell advertisement inventory to advertisers through advertisement networks, which may include systems such as, for example, ad-serving platform 120. Generally, advertisement networks sell advertisement inventory on behalf of multiple publishers to advertisers.

Utilizing advertisement networks such as those operated by Millennial Media Corporation may ensure that a publisher's advertisement inventory is sold while also increasing the number of advertisement conversions. In some embodiments, advertisement networks may add value to a publisher's advertisement inventory by utilizing intelligence derived from data associated with Internet-connectable devices 108. For example, as described below, advertisements may be more accurately targeted to users of Internet-connectable devices 108 based on determined intelligence data associated with the Internet-connectable devices 108.

In certain embodiments, ad-serving platform 120 may be, include, or be part of a technology and/or service that provides advertisements for display on Internet-connectable devices 108. In various embodiments, ad-serving platform 120 may be, for example, a general purpose computer, a server, a mainframe computer, a computer with a specific purpose of serving advertisements, or a combination of one or more thereof. For example, ad-serving platform 120 may be a specific computer that stores and determines advertisements to be served for display on Internet-connectable devices 108. In some cases, systems such as ad-serving platform 120 may be operated by advertisement network operators such as Millennial Media Corporation of Baltimore, Md.

In some embodiments, ad-serving platform 120 may comprise various components for performing ad-serving functionalities. As shown in the embodiment of FIG. 1, ad-serving platform 120 may comprise an ad server 102, data capture module 114, an ad-fulfillment module 112, data repositories for raw data 116 and intelligence data 104, and a data processing module 118. In certain embodiments, ad server 102 may be responsible for handling inbound requests for ads received from Internet-connectable devices 108 (or publisher web server 110) via network 106, consulting ad fulfillment module 112 for matching ad requests to ads in an ad inventory, sending responsive ads to requesting Internet-connectable devices 108 via network 106, receiving location events data and/or network events data from Internet-connectable devices 108 via network 106, and communicating received location events data and/or network events data to data capture module 114. In a particular embodiment, ad fulfillment module 112 may be responsible for determining optimal ads responsive to ad requests from Internet-connectable devices 108 based on, for example, ad campaigns, ad inventory, user data, and intelligence data stored in data repository 104. Data capture module 114 may perform the tasks of, for example, ingesting, filtering, and storing in data repository 116 raw location events data and/or network events data received from ad server 102. In some cases, ad server 102 may send location events data and/or network events data to data capture module 114 in real-time or, in other cases, such data may be sent asynchronously. Data processing module 118 may be responsible for, for example, processing raw location events data and/or network events data stored in data repository 116 to derive intelligence data, as described further below, and storing the intelligence data in data repository 104 for access by ad fulfillment module.

Ad-serving platform 120 may determine and serve ads to Internet-connectable devices 108 in response to ad requests initiated by, for example, publisher web server 110, or web browsers, software applications, software development kits utilized by publisher web server 110, or other software components executing on Internet-connectable devices 108. In many cases, such requests may be generated in response to a user action. For example, a user may go to a specific website, which may trigger an advertisement request; a user may launch an application, which may trigger an advertisement request either at launch or at some other predetermined time; or a user may perform an action within an application, which may trigger an advertisement request. In other cases, a user may not be actively engaged with an Internet-connectable device but a background service on the Internet-connectable device may automatically request an ad at a predetermined time or in response to a specific event. For example, a display apparatus on a refrigerator may request an ad without user intervention based on the expiration dates of various food items stored in the refrigerator. As another example, a background service executing on an Internet-connectable device may request an ad without user intervention when it is determined that the Internet-connectable device is within a certain distance from a particular location.

Data repositories such as, for example, data repositories 104 and 116 may include one or more files and/or relational and/or non-relational databases that store information that may be accessed, used, and/or managed by one or more devices within ad-serving platform 120. Data repositories 104 and 116 may be, include, or be part of any logical and/or physical data storage solution. For example, data repositories 104 and 116 may include one or more data storage devices for storing data. As specific examples, data repositories 104 and 116 may include volatile or non-volatile, magnetic, semiconductor, tape, optical, removable, non-removable, or other types of storage or computer-readable media. In some embodiments, data repositories 104 and 116 may store, for example, location events data and/or network events data associated with Internet-connectable devices 108, intelligence data determined based on the location events data and/or network events data, and user information, gathered by, and/or communicated to, ad server 102 or other components within ad-serving platform 120. The same or similar data may instead or also be stored in one or more other data repositories.

Figure 2:
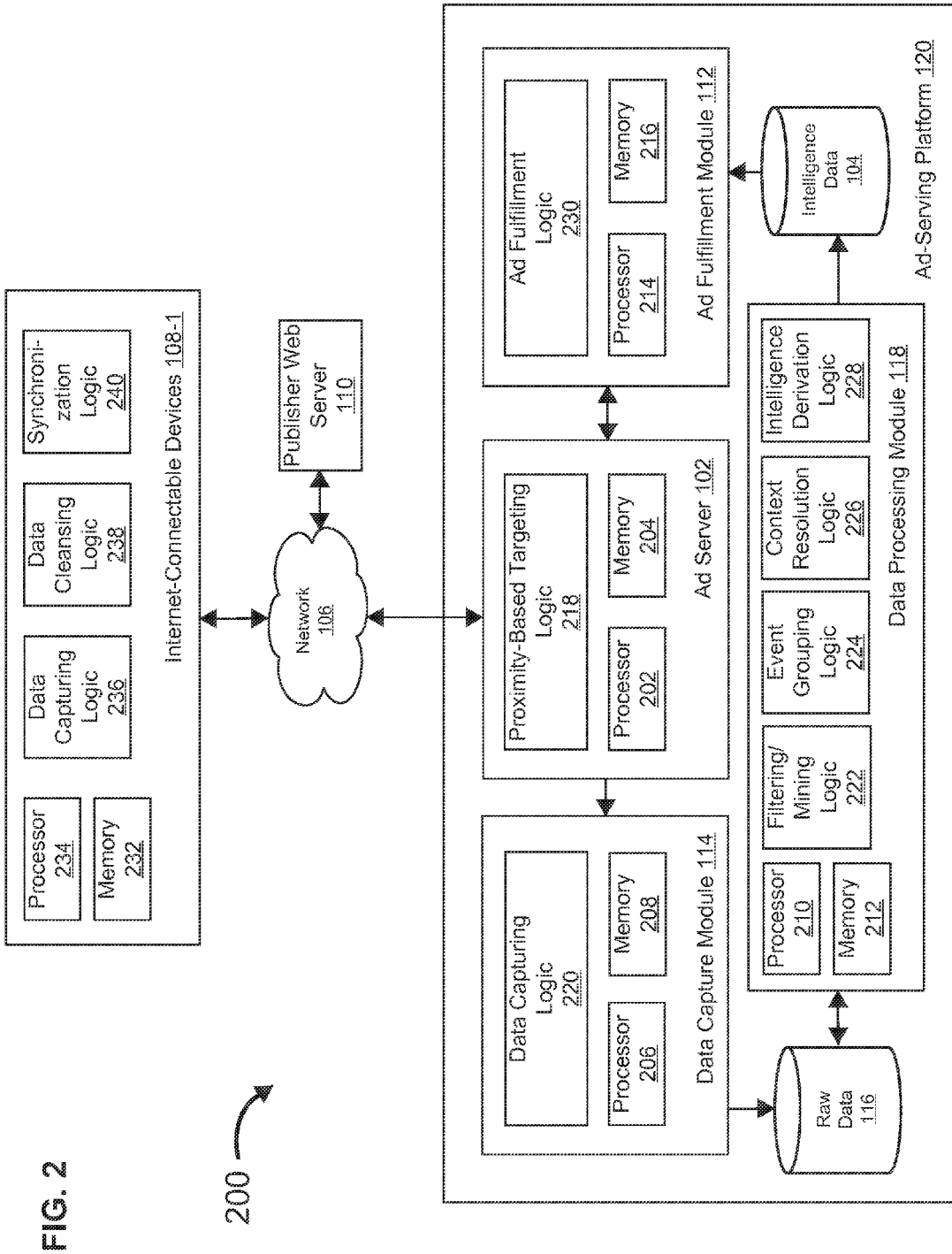
FIG. 2 illustrates a system that may be used with certain embodiments of the systems and techniques described herein.

FIG. 2 shows a more detailed diagram of the system shown in FIG. 1, which may be used with certain embodiments of the systems and techniques described herein.

As shown in FIG. 2, ad server 102, data capture module 114, data processing module 118, and ad fulfillment module 112 may each comprise one or more processors (202, 206, 210, 214), memory (204, 208, 212, 216), input/output (I/O) devices (not shown), and storage devices (not shown). In some embodiments, memory 204, 208, 212, and 216 may each load logic from respective storage devices (not shown) for execution by respective processors 202, 206, 210, and 214 for the purpose of performing one or more processes consistent with the systems and techniques disclosed herein. In a particular embodiment, ad server 102 may include proximity-based targeting logic 218; data capturing module 114 may include data capturing logic 220; data processing module 118 may include data filtering logic 222, grouping logic 224, context resolution logic 226, and intelligence derivation logic 228; and ad fulfillment module may include ad fulfillment logic 230. Memory 204, 208, 212, and 216 may also be configured with an operating system (not shown) that performs functions well known in the art when executed.

Regarding Internet-connectable device 108-1, memory 232 may load logic from a storage device (not shown) for execution by processor 234 for the purpose of performing one or more processes consistent with the systems and techniques disclosed herein. For example, Internet-connectable device 108-1 may include data capturing logic 236, data cleansing logic 238, and synchronization logic 240, which may, in some embodiments, be part of a software development kit installed on Internet-connectable device 108-1.

Publisher web server 110 may also include a processor, storage, and memory. Publisher web server 110 may include logic for receiving and responding to, for example, Hyper-Text Transfer Protocol (HTTP) requests and one or more server-side scripts for providing dynamic webpages. Such logic, for example, may be loaded into memory from storage and executed by a processor.

Processors as described herein, including, for example, processors 202, 206, 210, 214, and 234, may be, include, or be part of one or more known processing devices such as, for example, a microprocessor, a microcontroller, an application-specific integrated circuit (ASIC), a field programmable gate array (FPGA) or other type of processing circuitry, as well as portions or combinations of such circuitry elements.

Memory components as described herein, including, for example, memories 204, 208, 212, 216, and 232, may be viewed as an example of what is more generally referred to herein as a "computer program product" having executable computer program code in accordance with discussed techniques embodied therein such as, for example, intelligence derivation logic 228. Such memories may comprise electronic memories such as random access memory (RAM), read-only memory (ROM), or other types of memory, in any combination. One skilled in the art would be readily able to implement such computer program code given the teachings provided herein. Other examples of computer program products embodying aspects of the invention may include, for example, optical or magnetic disks, or other computer-readable media.

It should be noted that the particular examples of the hardware and software components that may be included in systems 100 and 200 are described herein in more detail, and may vary with each particular embodiment. For example, systems in accordance with the techniques such as systems 100 and 200 may comprise more than one of each of the hardware and software components specifically shown in FIGS. 1 and 2 although only single instances of such components are shown in simplified system diagrams 100 and 200 for clarity of illustration. Other hardware and/or software components of a type known to those skilled in the art may also or instead be incorporated into systems 100 and 200. It should also be noted that in some embodiments, functionalities and data provided by the components shown in systems 100 and 200 may be provided by other components shown or not shown in systems 100 and 200, or may not be provided at all. For example, publisher web server 110 may additionally provide the same or similar functionalities as provided by ad-serving platform 120.

Figure 3:
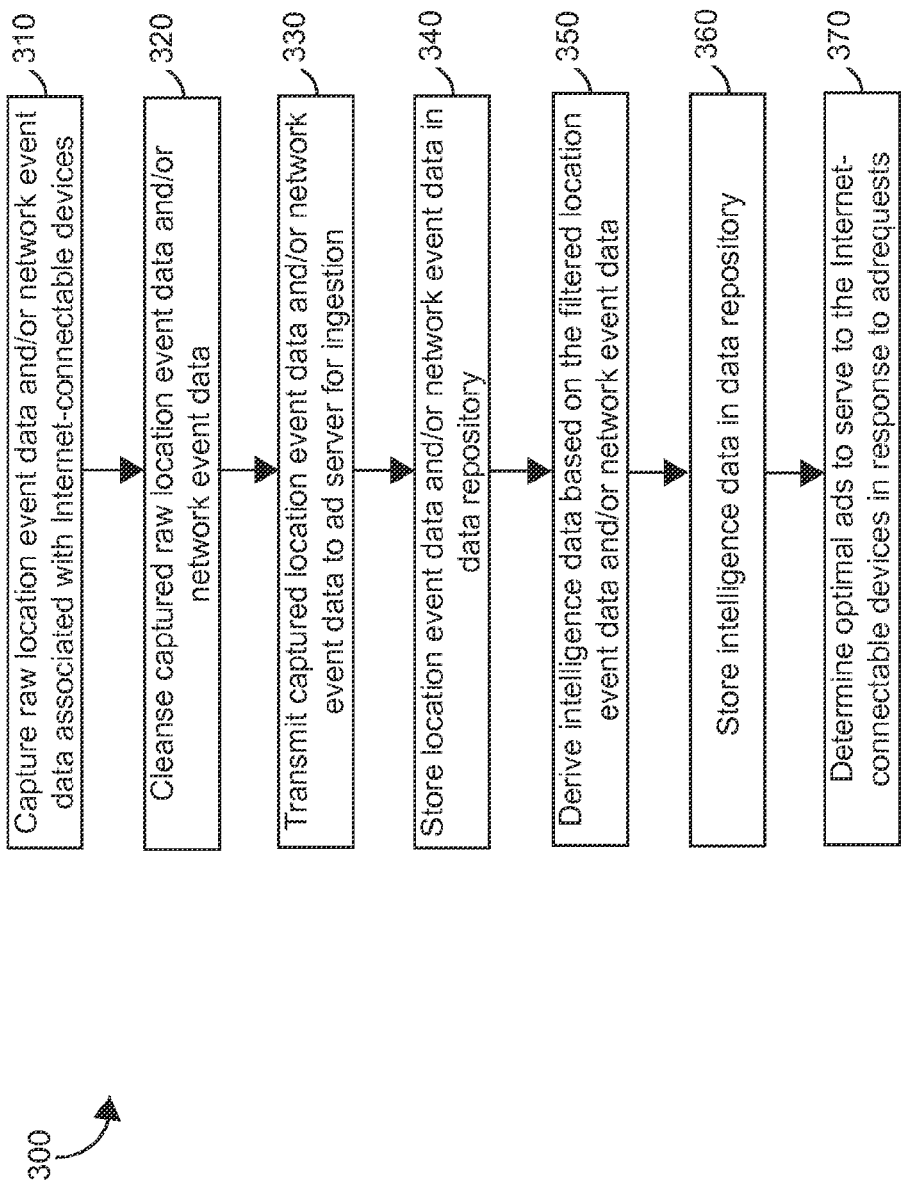
FIG. 3 illustrates a flow diagram that may be used with certain embodiments of the techniques described herein.

Referring now to FIG. 3, shown is a flow diagram 300 illustrating process steps that may be used with certain embodiments of the systems and techniques described herein.

At step 310, data associated with raw location events and/or network events may be captured by Internet-connectable device 108-1 using, for example, data capturing logic 236 (e.g., a software development kit). In some embodiments, data capturing logic 236 may differ between Internet-connectable devices 108 or other entities. For example, with respect to mobile phones, data capturing logic 236 may be unique to each mobile phone platform (e.g., IOS, ANDROID, BLACKBERRY, etc.). It should be noted that, in certain embodiments, location events data and/or network events data may instead or also be captured by, for example, publisher web server 110 and/or ad-serving platform 120, using the same or similar logic such as, for example, data capturing logic 220 within data capturing module 114.

In some embodiments, captured raw location events data may be uncleansed data identifying, for example, the location of Internet-connectable device 108-1 at a given moment in time. In a particular embodiment, captured raw location events data may include, for example, one or more of the latitude and longitude coordinates, speed, acceleration, orientation, altitude, and/or direction or bearing of Internet-connectable devices 108 at the time of one or more location event data captures; the precision or accuracy of each location event data capture; a unique identifier associated with Internet-connectable device 108-1; the time at which location events data is captured; status data, such as an internal indicator of the status of a transmission of location events data to ad-serving platform 120; service provider information; as well as several other parameters.

In certain embodiments, captured raw network events data may be uncleansed data that is generated by publisher-initiated ad requests as well as user interactions with an ad network such as, for example, raw network events data related to user interactions with served advertisements, advertisement impressions, clicks, and conversions. An advertisement impression may be the placement of an advertisement on a piece of "real estate" that is managed by a publisher. An example impression may be the display of an advertisement on a website. A click may represent an occurrence where an end-user selects an advertisement using, for example, a mouse click or touch screen selection. A conversion may refer to the process of matching a click on an advertisement with a corresponding user action that signifies fulfillment on the advertisement (e.g., making a purchase). Raw network events data gathered from impressions, clicks, and conversions may include, for example, domain data of a website on which an advertisement is displayed, an identifier and/or subject matter of an application in which an advertisement is displayed, advertisement metadata, Internet-connectable device information (e.g., operating system, handset characteristics, etc.), and any publisher metadata (e.g., primary/secondary channels).

In some embodiments of the systems and techniques described herein, data capturing logic 236 may capture the most accurate raw location events data associated with, for example, Internet-connectable device 108-1 as frequently as possible while minimizing the impact on the user and resources of Internet-connectable device 108-1. For example, data capturing logic 236 may acquire the most accurate raw location events data associated with Internet-connectable device 108-1 using, for instance, a GPS receiver, cell tower triangulation, and/or Wi-Fi location data at a desired and/or optimal time and/or frequency determined based on one or more device states of Internet-connectable device 108-1. In some embodiments, the time and/or frequency of raw location events data captures may be adjusted as the one or more device states of Internet-connectable device 108-1 changes. For example, in a particular embodiment, device state changes may indicate a change in the level of utilization of Internet-connectable device 108-1 resources and/or the movement of Internet-connectable device 108-1.

At step 320 data filters may be used to cleanse captured raw location events data and/or network events data before storing any events data locally within Internet-connectable device 108-1 and/or transmitting any events data to ad-serving platform 120. In some embodiments, cleansing may result in captured raw location events data and/or network events data of low quality or irrelevance being discarded and not stored within Internet-connectable device 108-1 or transmitted to ad-serving platform 120. The criteria for determining the quality and/or relevance of captured raw location events data and/or network events data may vary depending on, for example, the embodiment and/or the Internet-connectable device.

In some embodiments, events data cleansing may be handled by data cleansing logic 238 of Internet-connectable device 108-1, as shown in FIG. 2. In other embodiments, events data cleansing may instead or also be handled by ad-serving platform 120 (or another device) to avoid overburdening Internet-connectable device 108-1. The handling of events data cleansing by ad-serving platform 120 may also be desired due to the limited resources available to Internet-connectable device 108-1 such as, for example, limited storage space, memory capacity, and/or processor speed. For example, due to limited storage space, events data may be purged from Internet-connectable device 108-1 once transmitted to ad-serving platform 120. As a result, events data stored within Internet-connectable device 108-1 may not provide a large enough sample size to provide a full and accurate view of a user's events data history. Without a full and accurate view of a user's events data history, it may be difficult to determine the quality and relevance of captured events data in some cases. In these cases, ad-serving platform 120 may be better suited to cleanse events data as ad-serving platform 120 may have a full and accurate view of a user's events data history.

In some embodiments, captured raw location events data may be cleansed using, for example, accuracy and/or proximity data filters. In certain embodiments, accuracy data filters may be used, for example, for the purpose of determining and discarding raw location events data captures with an accuracy radius that is too large. Proximity data filters may be used, for example, to determine whether a raw location event data capture indicates that Internet-connectable device 108-1 is located within a specific distance tolerance of a previously captured location. If so, one of the location events data captures may be discarded and not stored within Internet-connectable device 108-1 and/or transmitted to ad-serving platform 120. In some cases, proximity data filters may be more heavily used for time-based captures of raw location events data, where the location of Internet-connectable device 108-1 may not have changed between location requests.

In some embodiments, data filters may also be used to cleanse raw location events data that indicates a "teleportation event," which is an impossible move from one location to another. Such data may be discarded and not stored within Internet-connectable device 108-1 and/or transmitted to ad-serving platform 120. Generally, a teleportation event may be caused by Internet-connectable device 108-1 misreading its current location.

One way to identify teleportation events is to compare the distance and time period between two locations to determine the velocity that would be required to travel between the locations. In some embodiments, if the velocity is above a certain threshold, both location event data captures may be identified as potential candidates for teleportation events. Identifying which event is the teleportation event may be achieved, for example, by looking at the overall context of Internet-connectable device's 108-1 location events data history.

At step 330 captured location events data and/or network events data may be transmitted to ad server 102 within ad-serving platform 120 via network 106. In some embodiments, transmission may be handled by synchronization logic 240 of Internet-connectable device 108-1, as shown in FIG. 2. In various embodiments, transmission may occur continuously, at a predetermined time, upon a triggering event, or at a time and/or frequency determined to be desired and/or optimal for such transmissions based on, for example, one or more device states of Internet-connectable device 108-1 as described above. In some embodiments, location events data may be packaged and transported over an encrypted and authenticated transport medium. In some embodiments, transmissions may be achieved incrementally by transmitting only location events data that has not been synchronized with ad-serving platform 120 since the last successful invocation of the synchronization process.

Once location events data and/or network events data is captured and transmitted to ad server 102, the location events data and/or network events data may be transmitted to data capture module 114, which may complete ingestion of the location events data and/or network events data by, for example, storing it in data repository 116 at step 340. In many embodiments of the disclosed systems and techniques, location events data and/or network events data associated with Internet-connectable device 108-1 may be stored by data capture module 114 as part of a record created for Internet-connectable device 108-1 upon first encounter of Internet-connectable device 108-1. In some embodiments, a record, and/or location events data and/or network events data, may be linked to Internet-connectable device 108-1 by a common unique global device identifier, or other attribute, associated with Internet-connectable device 108-1. In certain embodiments, ingested location events data and/or network events data may be indexed based on one or more data elements such as, for example, a timestamp. Internet-connectable device records may also maintain other information including, for example, whether each Internet-connectable device is opted in or out of behavioral targeting.

At step 350, intelligence data may be determined based on the stored location events data and/or network events data using, for example, logic within data processing module 118. At step 360, the intelligence data may be stored in data repository 104. Intelligence data may then be used by ad fulfillment logic 230 at step 370 for the purpose of determining optimal ads to serve to Internet-connectable device 108-1 in response to ad requests.

Figure 4:
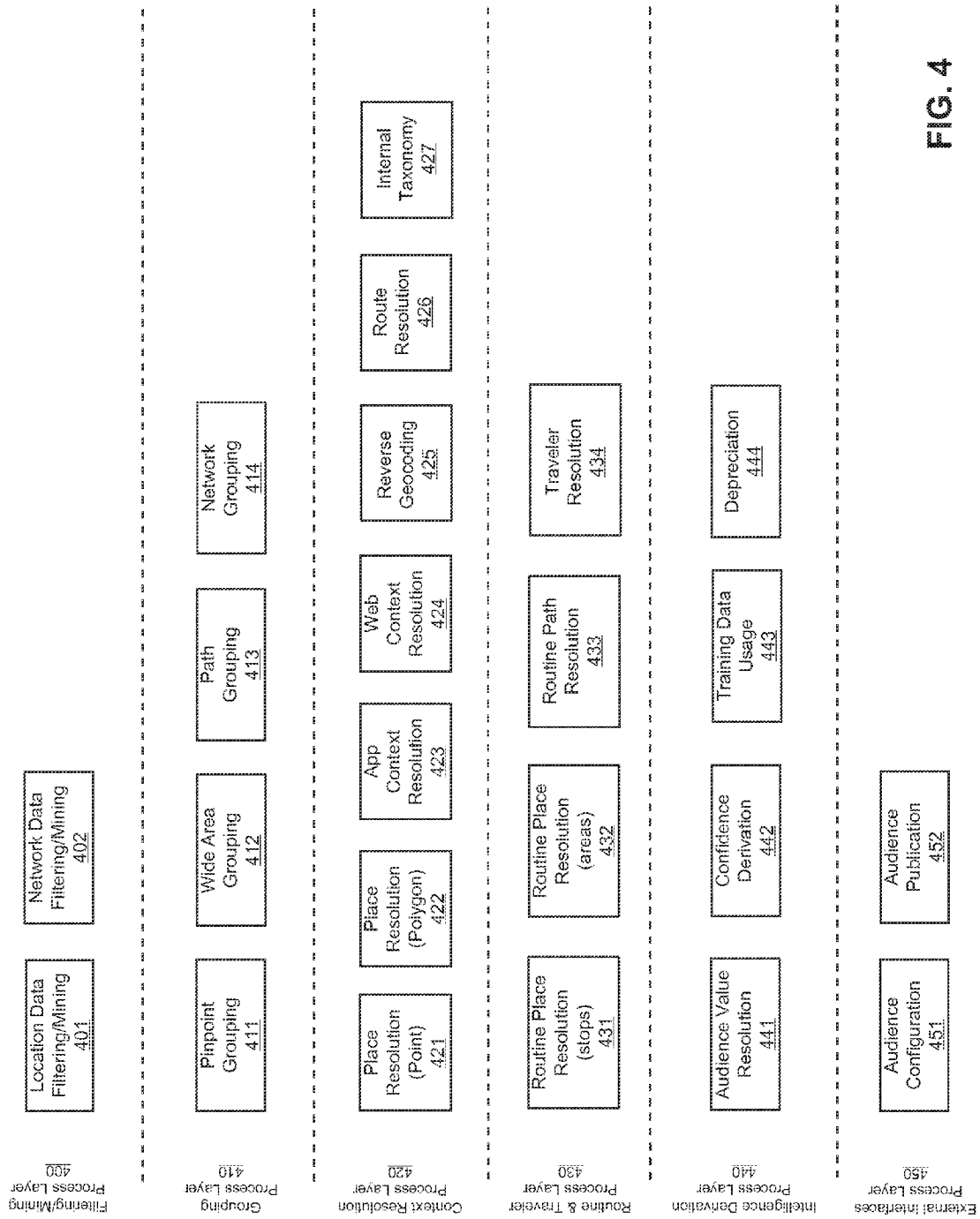
FIG. 4 illustrates a flow diagram that may be used with certain embodiments of the techniques described herein.

FIG. 4 illustrates process steps that may be used for deriving intelligence data based on location events data and/or network events data in accordance with some embodiments of the disclosed systems and techniques. FIG. 4 illustrates the process steps in a series of process layers organized from top to bottom, each subsequent process layer building upon the process steps performed within one or more previous process layers. The process layers illustrated in FIG. 4 include filtering and mining process layer 400, grouping process layer 410, context resolution process layer 420, routine and traveler process layer 430, intelligence derivation process layer 440, and external interfaces process layer 450. It should be noted that FIG. 4 merely depicts example process layers and process steps. For example, in certain embodiments, one or more of the process layers and/or process steps illustrated in FIG. 4 may not be required or performed, and/or different and/or additional process layers and/or process steps may be utilized.

As illustrated in filtering and mining process layer 400, location events data and/or network events data stored in data repository 116 may be filtered and mined (401, 402) using, for example, data filtering and mining logic 222 before any further data processing is performed. In some embodiments, filtering and mining processes 401 and 402 may execute in real-time or in an offline manner. In some embodiments, filtering and mining processes 401 and 402 may result in the removal of unneeded and/or unwanted location events data and/or network events data. In some embodiments, filtering and mining processes 401 and 402 may vary depend on, for example, the type of processing to be performed within the subsequent process layers. In certain embodiments, location events data and/or network events data removed during filtering and mining processes 401 and 402 may remain in data repository 116, as the data may be useful for other to-be-performed data processing. In some embodiments, filtering and mining processes 401 and 402 may also provide the benefit of reducing the volume of data to be processed.

In a particular embodiment, filtering and mining processes 401 and 402 may include filtering location events data and/or network events data based on, for example, the ability to resolve unique global identifiers; the ability to resolve domain/application information; whether any Internet-connectable devices have opted out of behavioral targeting; geographical thresholds; data accuracy thresholds; and the inability to map location events data and/or network events data to an internal taxonomy of audience categories, as described below. For example, location events data and/or network events data originating from countries that are not being targeted by advertisers, or location events data that does not correspond to a precise location, may be removed during the filtering process. As another example, filtering and mining processes 401 and 402 may also include the identification and removal of teleportation events.

In some embodiments, as illustrated in grouping process layer 410, raw location events data, network events data, and/or data derived in filtering and mining process layer 400 may be combined into one or more event groupings using, for example, event grouping logic 224. In some embodiments, event groupings may provide process steps within subsequent process layers with more accurate and meaningful data than would be provided with a single location event or network event. As a result, process steps within subsequent process layers may also provide more accurate and meaningful data.

In some embodiments, event grouping may be divided into network event grouping 414 and location event grouping, the latter of which may comprise, for example, pinpoint grouping 411, wide area grouping 412, and/or path grouping 413. In certain embodiments, location event grouping may group filtered location events based on one or more attributes associated with the filtered location events. For instance, location event grouping may consider attributes such as, for example, latitude, longitude, horizontal accuracy, and/or timestamp. In some cases, the attributes considered may depend on the type of grouping to be performed (e.g., pinpoint grouping 411 versus wide area grouping 412).

In some embodiments, pinpoint grouping 411 may include grouping location events associated with an Internet-connectable device (e.g., 108-1) to identify "stops," which may be isolated locations identified by latitude/longitude coordinates that are visited by the user of the Internet-connectable device for a minimum amount of time. In these embodiments, identified stops may be the result of fine-grained location grouping techniques. Example techniques for performing pinpoint grouping 411 include intersecting circle geometry and Kalman filtering.

Figure 5:
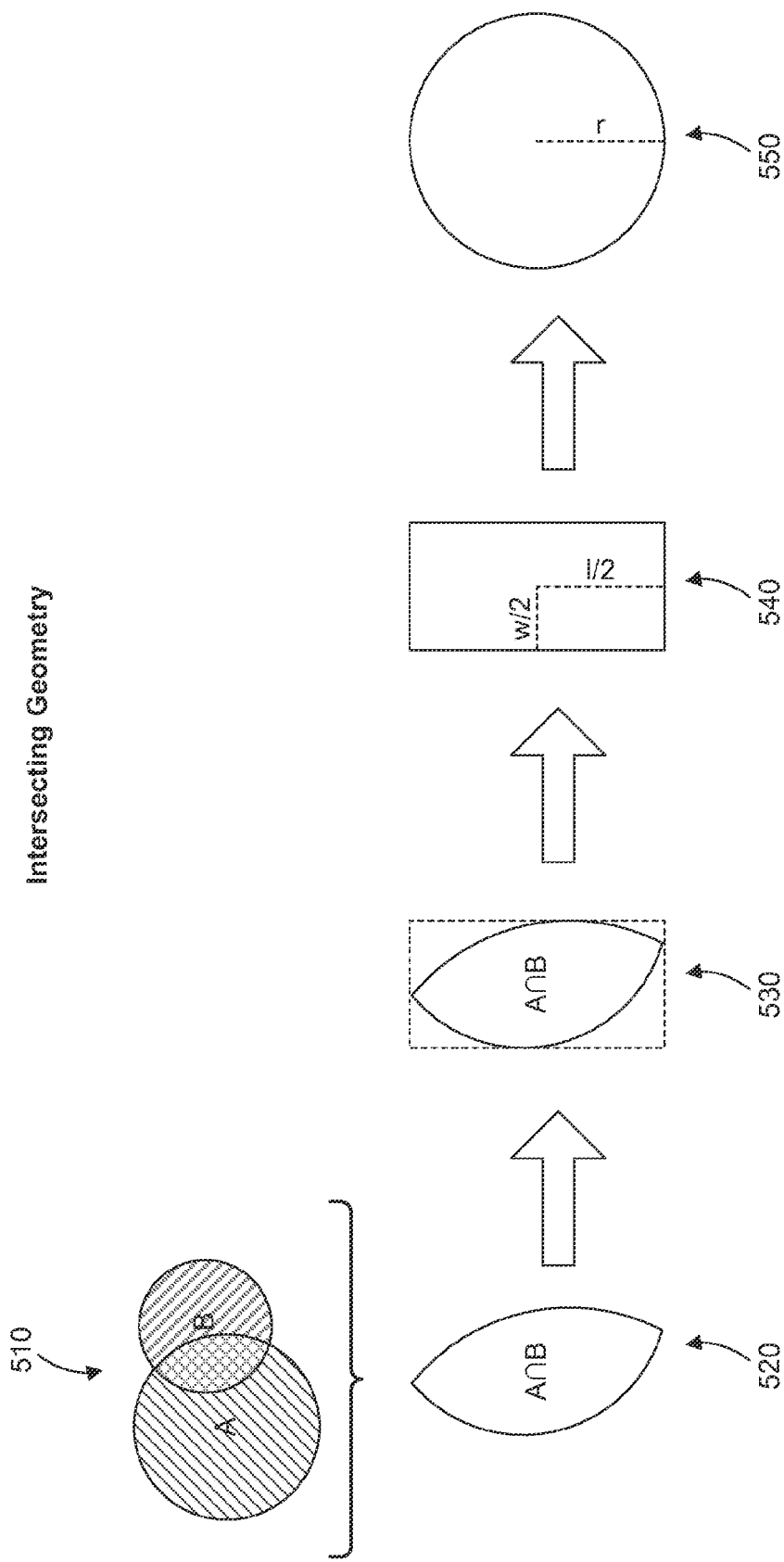
FIG. 5 illustrates an example technique for pinpoint grouping that may be used with certain embodiments of the systems and techniques described herein.

In some embodiments, the intersecting circle geometry technique, an example of which is illustrated in FIG. 5, may be used to group low-accuracy location events such as, for example, location events determined using cell tower triangulation. When grouping low-accuracy location events, the intersecting geometry technique may more accurately identify locations visited by an Internet-connectable device and give greater preference to more accurate results in comparison to other pinpoint grouping techniques.

In certain embodiments, to enable geometric calculations using standard Cartesian coordinates, the intersecting circle geometry technique may first convert latitude/longitude coordinates of location events to the Universal Transverse Mercator (UTM) coordinate system. As shown at step 510 of FIG. 5, the intersecting geometry technique may then examine two location events associated with an Internet-connectable device, a reference (starting) location event (A) and a comparison location event (B), and draw a circle around each one. The center of each location event circle may be, for example, the UTM coordinate, and the radius may be equal to the reported accuracy of the location event (e.g., cell tower triangulation may have an accuracy radius of around 500 meters). If the two location event circles intersect, the location events are merged and the intersection is determined and treated as a potential stop at step 520.

At step 530, the geometric area of the determined intersection may be calculated along with its centroid and bounding box, or "envelope," as shown by the dotted box in FIG. 5. At step 540, the longest length from the centroid to the center of an edge of the envelope is determined. At step 550, the potential stop's UTM coordinates are set to the centroid, and the radius of the potential stop is set to the length determined at step 540. Based on the UTM coordinates and the radius determined at step 550, a circle may be drawn around the potential stop as can be seen at step 550. In some embodiments, the amount of time the Internet-connectable device was located at the potential stop may also be calculated. For example, the potential stop's beginning time may be set to the timestamp associated with the earliest merged location event and the potential stop's ending time may be set to the timestamp associated with the newest merged location event.

In certain embodiments, the steps illustrated in FIG. 5 may be repeated for subsequent location events in the Internet-connectable device's sequence of location events. For example, returning to step 510, the reference location event may be the potential stop and the comparison location event may be the next location event in the Internet-connectable device's sequence of location events. In these embodiments, as long as location event circles intersect with the potential stop circle, the potential stop circle and the amount of time the Internet-connectable device was located at the potential stop may be recalculated. If a subsequent location event circle completely overlaps with the potential stop circle, the amount of time may be extended and the centroid may be adjusted based on the centroid of each circle. If a subsequent location event circle only partially overlaps with the potential stop circle, the area of the potential stop circle may reduce in size and the amount of time may be extended.

In some embodiments, if no location event circles overlap with the potential stop circle, the amount of time the Internet-connectable device was located at the potential stop may be checked against a threshold. If the amount of time is greater than the threshold, the potential stop may be stored as a stop, and its UTM coordinates may be converted back to latitude/longitude coordinates. If the amount of time is less than the threshold, the potential stop may be discarded. In some embodiments, checking the amount of time against a threshold may result in only significant stops being stored. For example, stops at traffic lights may be discarded.

In some embodiments, the Kalman filtering technique may be used to group high-accuracy location events such as, for example, location events identified using GPS. For example, although GPS-determined location events may have better (i.e., smaller) accuracy ranges, GPS data has a margin of error and can sometimes appear to "jump" around the correct location. Thus, as described below, the Kalman filtering technique may be used to correct this margin of error by using models and a weighted averaging technique to produce better estimates of location events.

In certain embodiments, the Kalman filtering technique may review location events associated with an Internet-connectable device to determine whether they fall within a certain accuracy and distance from each other. If so, the location events may qualify to be merged. In some embodiments, a determination as to whether location events should be merged may be based on a maintained model comprised of a probable range of motion and the recent history of movement of the Internet-connectable device. If the location events qualify to be merged, a weighted average technique may be used to merge the location and accuracy of the location events into a stop. As with the intersecting geometry technique, in some embodiments, subsequent location events may be merged with the stop until subsequent location events no longer qualify. In a particular embodiment, weight may be added to the stop with each location event that is merged into it. For example, if a stop comprised of three location events has a fourth location event merged into it, the stop's location and accuracy may be weighted three times more heavily than new location events (all other factors being equal). Also, as with the intersecting geometry technique, in some embodiments, the amount of time the Internet-connectable device was located at the stop may be determined and checked against a threshold to determine whether the stop should be discarded as insignificant.

In certain embodiments, wide area grouping 412 may include grouping location events associated with the Internet-connectable device to determine a general area visited by the Internet-connectable device for the purpose of, for example, determining where the Internet-connectable device has traveled. In these embodiments, determined areas may represent higher level abstractions about where the user of the Internet-connectable device has spent time and may be the result of coarse-grained location grouping techniques.

In some embodiments, wide area grouping 412 may operate on two or more distance levels such as, for example, medium range and long range. In this example, a first pass may group location events within a medium range (e.g., 1-10 km), and a second pass may combine the medium-range location event groups with location event groups within a long range (e.g., 50-100 km). In some embodiments, users of Internet-connectable devices may be enrolled into different audience values depending on whether the user is associated with a medium- or long-range area. For example, a user may be enrolled into audience values based on travel to different parts of a city, different cities, or different countries. In certain embodiments, each audience value may require a different level of granularity for the area data.

Figure 6:
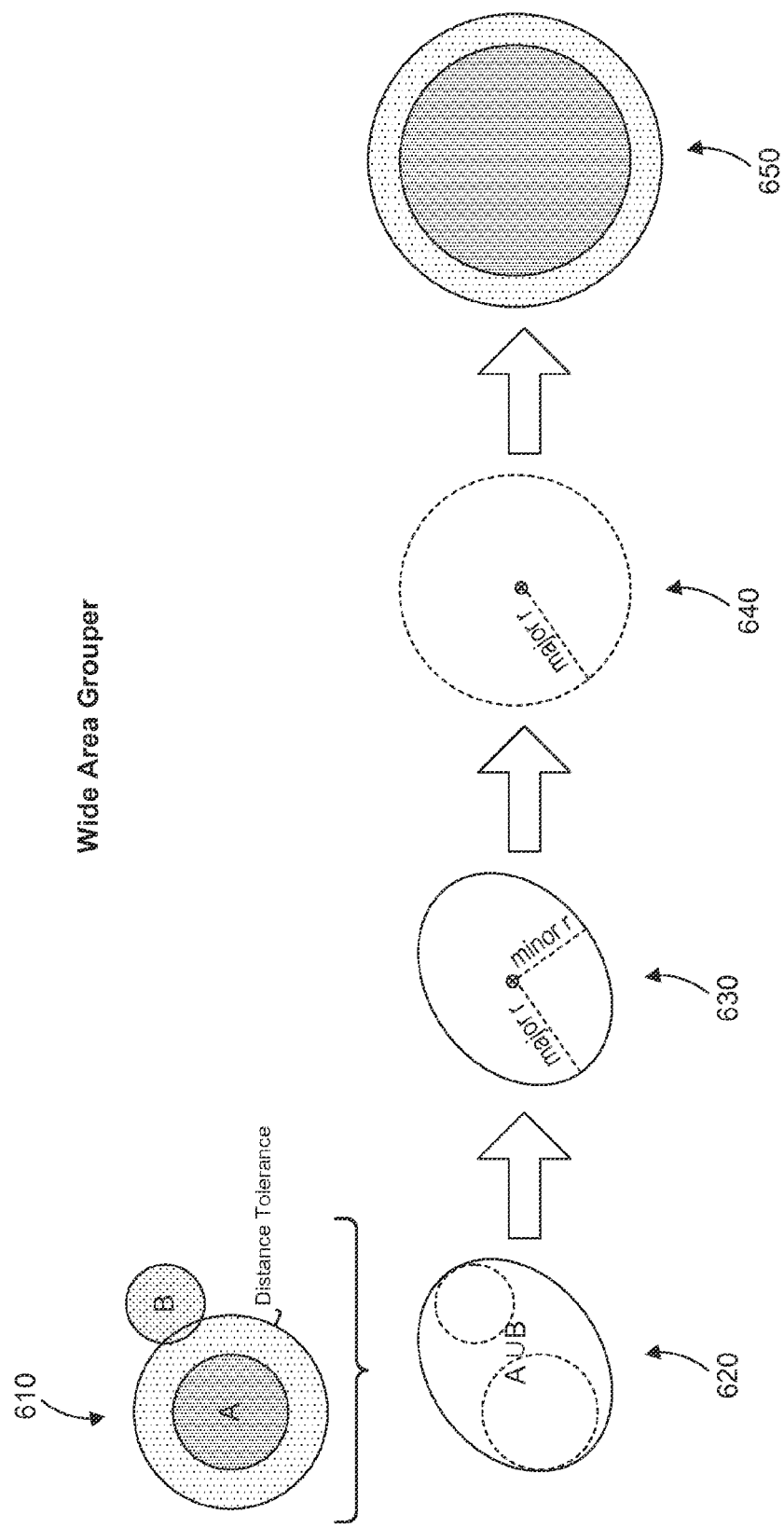
FIG. 6 illustrates an example technique for area grouping that may be used with certain embodiments of the systems and techniques described herein.

An example of wide area grouping 412 is illustrated in FIG. 6. In some embodiments, to enable geometric calculations using standard Cartesian coordinates, wide area grouping 412 may first convert latitude/longitude coordinates of location events to the Universal Transverse Mercator (UTM) coordinate system. As shown at step 610 of FIG. 6, wide area grouping 412 may then examine two location events associated with an Internet-connectable device, a reference (starting) location event (A) and a comparison location event (B), and draw a circle around each one. The center of each location event circle may be, for example, the UTM coordinate, and the radius may be equal to the reported accuracy of the location event (e.g., cell tower triangulation may have an accuracy radius of 500 meters). If the two location event circles intersect, wide-area grouping may merge the location events using, for example, geometric union operations at step 620. In certain embodiments, comparison location event circles that do not intersect with but fall within a certain distance tolerance to the reference location event circle may also be considered at step 620 to be merged with the reference location event.

At step 620, the union between the reference location event circle and the comparison circle may be determined, resulting in an ellipse. At step 630, the centroid of the ellipse may be determined as well as the major and minor radii. At step 640, a circle may be created based on the major radii, and a tolerance buffer may be created for the circle at step 650. In some embodiments, the steps of FIG. 6 may be continuously repeated with the circle created at step 640 taking the place of the reference location event until no more location events fall within the circle created at step 640, or within a certain distance tolerance to the circle. Once no more location events fall within the reference location event circle, the circle may be stored as a visited area, and the UTM coordinate may be converted back to latitude/longitude coordinates.

In some embodiments, for a reference location event circle and the comparison circle to be considered for area grouping 412, the corresponding location events must fall within a certain time threshold. If the two location events do not fall within a certain time threshold, they may be considered as separate areas.

In some embodiments, path grouping 413 may be used to capture movement of an Internet-connectable device. Path grouping 413 may include the grouping of location events, stops, and/or areas to determine paths traveled by an Internet-connectable device. In certain embodiments, paths may be interspersed with, for example, stops, but a second level of analysis may also merge paths separated by short distances.

In at least one embodiment, path grouping 413 may run in parallel with pinpoint grouping 411. In this embodiment, as location events are examined, location events that demonstrate evidence of motion (e.g., a speed greater than a threshold or some other attribute indicating motion) may be handled by path grouper 413 while those that show location events in the same place over time may be handled by a pinpoint grouper. For example, the first location event that demonstrates evidence of motion may result in the end of a current pinpoint grouping 411 process and the beginning of a new path grouping 413 process. As additional location events that demonstrate motion are reached, the additional location events may be added to a path group. In some embodiments, an overall direction and average speed for the path may be calculated and updated with each addition of a location event. When a location event is examined that no longer shows evidence of motion, the path grouping 413 process may end and a new pinpoint grouping 411 process may begin.

Figure 7:
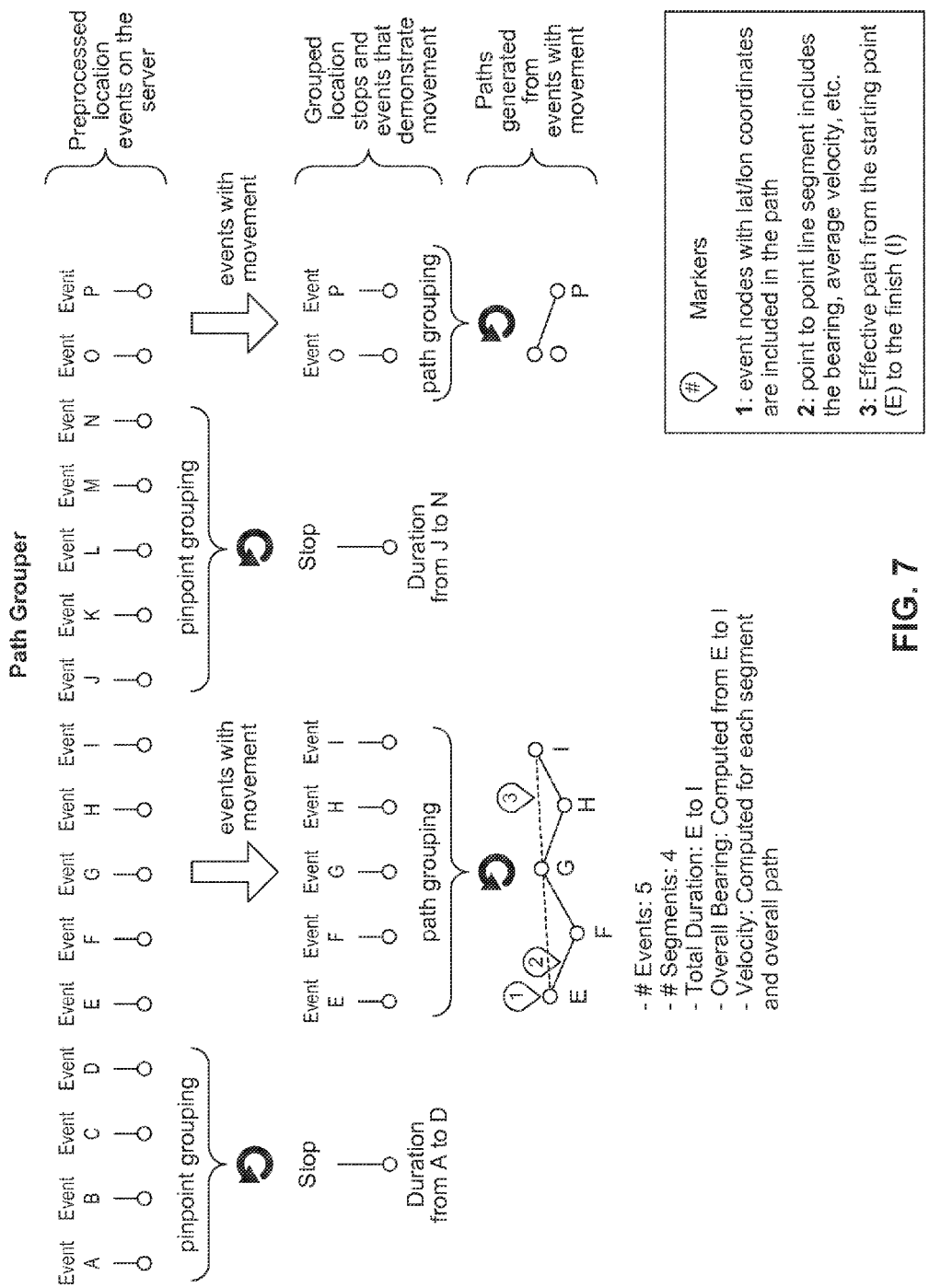
FIG. 7 illustrates an example technique for path grouping that may be used with certain embodiments of the systems and techniques described herein.

An example of a path grouper running in parallel with a pinpoint grouper is illustrated in FIG. 7. As shown in FIG. 7, location events A through P are examined. Location events A through D may be determined to not evidence motion and, thus, pinpoint grouping may merge location events A through D, resulting in the identification of a stop. Location events E through I may be determined to evidence motion and, thus, path grouping may determine a path beginning at location event E and extending to location event I. Location events J through N may be determined to not evidence motion and, thus, pinpoint grouping may merge location events J through N, resulting in the identification of a stop. Lastly, location events O and P may be determined to evidence motion and, thus, path grouping may determine a path beginning at location event O and ending at location event P. As also shown in FIG. 7, in certain embodiments, visit and path durations may be calculated by examining timestamps of beginning and ending location events; paths may be comprised of location event nodes that include, for example, latitude/longitude coordinates; paths may be comprised of line segments between location event nodes that include, for example, bearing (computed for an entire path) and velocity (computed for each line segment and the overall path) information; and effective paths extending from the beginning location event node to the ending location event node may be determined.

In some embodiments, event grouping may be history-aware, meaning that historical event data may be considered when grouping event data. History-aware grouping may, in some cases, improve the accuracy of grouped event data. For example, path grouping may more accurately identify paths taken by an Internet-connectable device by considering recurring stops from previous time periods. As a specific example, history-aware path grouping may consider, for example, the fact that an Internet-connectable device tends to be located at a first location every weekday from 8:00 a.m. to 5:00 p.m. and at a second location every weekday from 6:00 p.m. to 7:00 a.m. History-aware grouping may be particularly helpful when performing place resolution 421. For example, if a user visits the same set of stores on a regular basis, place resolution 421 may more confidently determine that the user is at one of those store in the future (e.g., a confidence value may be higher).

Network grouping 414 may be used to group content from ad-server traffic, such as, for example, to collapse ad views into smaller transactions as well as to amplify the accuracy of the overall data set. In some embodiments, network grouping 414 may include, for example, aggregating network event data associated with an Internet-connectable device, the aggregated network event data associated with an individual session with, for example, a publisher website or application. Impression grouping, for instance, may collapse multiple impressions that occur during an individual session into a single grouping that includes metadata that specifies, for example, the duration of the session, the number of impressions during the session, information associated with each impression, and/or domain data. In some embodiments, aggregate metadata fields may be used to track information about each of the individual events in a grouped session. For example, if a user is playing a game on the user's Internet-connectable device for 30 minutes and has been served 10 ads from an ad server during this time period, one grouped interaction with the ad server may result with a count of 10 ads and a duration of 30 minutes. Other network event groupings may consider, for example, clicks and/or matched conversions.

It should be noted that, in some embodiments, an event grouping may be comprised of a combination of location event data and network event data, as well as other data.

Within the context resolution process layer 420, raw location events data, raw network events data, and/or data derived in any one or more of the previous process layers may be given a real-world context using, for example, context resolution logic 226. Context resolution may be comprised of, for example, location data context resolution and network data context resolution. Examples of location data context resolution in a particular embodiment may be point place resolution 421, polygon place resolution 422, and route resolution 426. Examples of network data context resolution in a particular embodiment may be application context resolution 423 and web context resolution 424. Examples of other context resolution processes that may be used in some embodiments of the disclosed systems and techniques include reverse geocoding 425, and internal taxonomy mapping 427.

In certain embodiments, point place resolution 421 may be used to determine a place of interest to a user of an Internet-connectable device based on, for example, one or more stops visited by the Internet-connectable device, as determined using pinpoint grouping. A place of interest may be, for instance, commercial or non-commercial places located near a stop such as, for example, a restaurant, shop, museum, theatre, park, etc. In some embodiments, an internal resource or an external resource provided by a third party may be queried, for example, to provide the translation from coordinate-based data, or data determined using reverse geocoding 425 (described below), to one or more viable places of interest. Such external resources may provide, for example, business names, street addresses, categories and/or subcategories associated with a place of interest, business hours, price structure, and other details.

In certain embodiments, polygon place resolution 422 may be performed to determine a specific area visited by a user of an Internet-connectable device. In some embodiments, polygon place resolution 422 may query, for example, one or more stops associated with an Internet-connectable device against geographical polygon data to determine whether the stops fall within a geographically-defined area. Geographical polygons may represent predefined bounded areas of various size such as, for example, neighborhoods, cities, outdoor activities, urban activities, transportation hubs, and custom bounded areas. In some embodiments, polygon place resolution 422 may be used to retrieve real-world context data associated with, for example, a stop or area visited by an Internet-connectable device based on metadata associated with a bounded area in which the stop or area is located. In a particular embodiment, bounded area metadata may be retrieved from a third-party resource.

A neighborhood bounded area may be relatively small in scale and provide, for example, demographic and real estate data. A city bounded area may be similar to a neighborhood bounded area but may cover a relatively large area. City bounded areas may also be included in "destination" bounded areas, which may be used to identify different types of urban destinations such as, for example, business, leisure, gambling, and sporting destinations. An outdoor activity bounded area may identify a large area such as, for example, national parks and wilderness areas. Outdoor activity bounded areas may provide information about popular outdoor activities including, for example, hunting, fishing, skiing boating, and scuba diving. An urban activity bounded area may be similar to an outdoor activity bounded area but on a smaller scale. For example, an urban activity bounded area may identify a beach, amusement park, sports venue, or concert venue. A transportation hub bounded area may include, for example, airports, bus stations, and train stations. Custom bounded areas may be areas defined by, for example, a customer. For example, a customer may define a bounded area for a store owned by the customer.

In some embodiments, place resolution 421 and 422 may be built on a probability model. In these embodiments, place resolution 421 and 422 may consider many weighted factors when determining, for example, a place of interest or a general area visited by a user of an Internet-connectable device. For example, point place resolution 421 may consider factors such as the accuracy of a stop, the duration of time spent at a stop, the distance between a stop and a place of interest, metadata associated with viable places of interest, the reliability and accuracy of the data provided by external resources, the types of businesses in the general area of a stop, the time of day, the density of viable places of interest in a given location, previous visits to the same area/location, etc. In some embodiments, one or more of these factors may be given a weight based on, for example, the reliability of the factor. In certain embodiments, weighted factors may be used to determine and assign confidence values to, for example, one or more viable places of interest or areas. In these embodiments, the confidence values may be used to determine preferable places of interest and/or areas. In some cases, places of interest and/or areas that are less preferable may be discarded. As a specific example, the time of day associated with a stop may result in the selection of a business of a certain type as a place of interest versus a business of a different type.

In some embodiments, route resolution 426 may be used to determine routes based on paths, as determined using path grouping. Routes may identify, for example, roads, highways, and/or railways traveled by an Internet-connectable device defined by segments with start and end points. In some cases, route data may be provided using an external resource provided by a third party, such as mapping software.

Web context resolution 424, in some embodiments, may be used, for example, to determine context data associated with provided web domain data (e.g., Uniform Resource Locator). For example, web domain data may be used to query third-party web content categorization services for subject matters and/or brands related to the provided web domain data. A component within ad-serving platform 120 may perform calls to the third-party web content categorization services to retrieve the data. In some embodiments, a caching system may be used to store the data locally for a pre-determined period of time to avoid request duplication. In certain embodiments, application context resolution 423 may be used to determine context data such as, for example, subject matters and/or brands, related to provided application data. For example, application context resolution 423 may consider pertinent information extracted from software application stores (e.g., ANDROID and IOS application stores) to determine the subject matter of an application used by a user on an Internet-connectable device.

In some embodiments, location data context resolution may utilize reverse geocoding 425 when determining a real-world context of, for example, one or more stops visited by an Internet-connectable device. Reverse geocoding 425 may be used to determine, for example, the city, state, postal code, neighborhood, and/or street address of a stop. In certain embodiments, the data retrieved using reverse geocoding 425 may vary depending on the type of information ultimately desired for the stop. For example, if demographic information, including, for instance, affluence, education, and employment, is desired for the stop, neighborhood and/or city data may be retrieved using reverse geocoding 425. As another example, if data necessary for performing place resolution, as described below, or real estate information for a stop is desired, street address data may be retrieved using reverse geocoding 425. In some embodiments, reverse geocoding 425 data may be retrieved from, for example, a third-party reverse geocoding resource based on provided latitude/longitude coordinates associated with a stop.

In some embodiments, context resolution 420 may include mapping derived context data associated with a user of an Internet-connectable device to one or more audience categories and/or internal audience category taxonomies 427. In some embodiments, an audience category may be, for example, a particular brand and/or subject matter to which derived context data may be associated. In some embodiments, a standardized taxonomy of audience categories may consist of multiple audience categories arranged in a hierarchical tree structure. For example, a standardized taxonomy of audience categories may consist of one or more sequences of audience categories arranged in a broad-to-narrow relationship. Additionally, each audience category may have multiple branches, each consisting of a different sequence of audience categories. As a specific example, a "New Car Dealership" audience category may be included as part of the following sequence of audience categories arranged from broad to narrow: "Shopping">"Automotive">"New Car Dealership." As another specific example, a "Gym" audience category may have multiple branches, each comprised of a different sequence of audience categories. Two such branches are represented as follows: "Gym">"Supplements Store">"GNC" and "Gym">"Supplements Store">"VITAMIN SHOPPE."

In some embodiments, determining whether derived context data associated with a user of an Internet-connectable device is mapped to an audience category and/or an audience category taxonomy may be rule-based, wherein each rule may be unique to and/or customizable for each audience category and/or audience category taxonomy. In certain embodiments, an audience category affinity rule that is associated with an audience category and/or audience category taxonomy may require that certain criteria are met in order for a user of an Internet-connectable device to be mapped to that audience category and/or audience category taxonomy. In some embodiments, such criteria may be met in more than one way. For example, an audience category affinity rule may be satisfied based on real-world context data determined using reverse geocoding 425, place resolution 421 and 422, route resolution 426, routine place resolution 431, web context resolution 424, application context resolution 423; event groupings 411-414; location events data; or network events data alone, or a combination thereof.

As a specific example, an audience category affinity rule may require a certain number of visits and/or frequency of visits by a user of an Internet-connectable device to one or more places and/or areas in order for the user to be mapped to an audience category and/or audience category taxonomy. For example, an audience category affinity rule defined for a "Gym" audience category may require a user of an Internet-connectable device to visit gym-related places at least once a week in order for the user to be mapped to the "Gym" audience category. As another example, an audience category affinity rule defined for a "Home Improvement Store" audience category may require the user to visit a home improvement store once a week in order for the user to be mapped to the "Home Improvement Store" audience category. As yet another example, an audience category affinity rule may require a certain number of conversions associated with an audience category in order for the user to be mapped to the audience category.

A standardized taxonomy of audience categories may be implemented in various ways. In some embodiments, a standardized taxonomy of audience categories may be implemented using a data structure. For example, in a particular embodiment, a tree data structure that emulates a hierarchical tree structure with a set of linked data nodes may be used. In this embodiment, each data node may represent an audience category belonging to a standardized taxonomy of audience categories.

In many embodiments, a standardized taxonomy of audience categories may be modified and/or customized. For example, in some embodiments, audience categories may be added and/or removed from a tree structure based on, for example, advertisement campaigns. As another example, in some embodiments, an advertiser may be associated with a standardized taxonomy of audience categories customized for the needs of that advertiser.

Within the routine and traveler process layer 430, places and/or areas a user of an Internet-connectable device is routinely located or the user has visited may be determined based on raw location events data, raw network events data, and/or data derived in any one or more of the previous process layers using, for example, routine locations logic 227. Process layer 430 may comprise, for example, routine place resolution 431 (stops), routine place resolution 432 (areas), routine path resolution 433, and traveler resolution 434.

In certain embodiments, routine place resolution 431 and 432 may be used to identify places of interest or areas visited by a user of an Internet-connectable device on a regular basis. Example routine places may include, for example, where an Internet-connectable device user lives, works, goes to school, or shops. In some embodiments, routine place resolution 431 and 432 may determine routine places based on, for example, place resolution 421 and 422 and/or route resolution 426. As a specific example, routine place resolution 431 and 432 may identify a routine place based on stops and/or areas at which an Internet-connectable device is located for a significant amount of time, as well as on which days and at what times the Internet-connectable device is located at the stops and/or areas. As another example, a routine place may be identified based on whether a stop identified as a candidate routine place is a start or end point of a route determined using route resolution 426.

In some embodiments, routine place resolution may identify the location of a routine place for an Internet-connectable device by first identifying candidate stops associated with the Internet-connectable device that overlap with a time window that corresponds to the routine place and storing the duration of each candidate stop's overlap with the time window. For example, to determine a home routine place for an Internet-connectable device, routine place resolution may identify candidate stops associated with the Internet-connectable device that overlap with a 10:00 p.m. to 6:00 a.m. time window and store the duration of each candidate stop's overlap with the time window. In these embodiments, once candidate stops are identified, they may be grouped by location, and the overlap durations of the candidate stops may be added together for each group. The grouped candidate stops may then be organized by overlap duration. The group with the longest overlap duration may be the best candidate for the routine place corresponding to the time window. In certain embodiments, the time windows may be configured. In some cases, increasing the size of a time window may include more candidate stops but may also lower the accuracy of routine place determinations.

In certain embodiments, routine path resolution 433 may be used to identify paths routinely traveled by a user of an Internet-connectable device. As an example, routine path resolution 433 may identify a routine path based on the number of times a user has traveled a specific path based on data derived using route resolution 426.

In some embodiments, travel by a user of an Internet-connectable device may be determined using traveler resolution 434. In a particular embodiment, traveler resolution 434 may determine areas visited by the user that are outside of the user's home area, which may be determined using routine place resolution 431 and/or 432. In this embodiment, the size of a user's home area may be directly proportional to the number of routine places associated with the user, and if multiple routine places are associated with the user, the distance between the routine places, the amount of time spent at each routine place, etc.

Traveler resolution 434 may consider various factors when determining whether a user is a traveler. For example, traveler resolution 434 may consider continuous lengths of time spent outside of the user's home area, discarding any negligible time spent outside of a user's home area that may be attributable to, for example, daily commuting. In some embodiments, a visited area may be a coarse-grained area visited by the user determined based on wide area grouping 412, but traveler resolution 434 may also consider one or more stops and/or paths within that area. In certain embodiments, a user may be associated with multiple visited areas and return trips to those visited areas may be tracked.

What follows are example process steps that may be performed by travel resolution 434 in accordance with some embodiments of the systems and techniques disclosed herein. In these embodiments, an Internet-connectable device user's home area may be determined. Once the user's home area is determined, location events outside of the user's home area may be tracked and grouped into "visits" if within a configurable radius of other location events outside the user's home area. Additional information such as, for example, overnight stays within a visited area may also be tracked. In some cases, overlapping groups may be merged into a single and/or additional group. In these embodiments, visits may be grouped into "visited areas" based on a larger configurable radius such as, for example, a radius of 100 km. In these embodiments, a traveler score, which may be indicative of the amount a user travels to a visited area, may be determined for a visited area associated with the user based on, for example, the number of visits and overnight stays within the visited area.

Within the intelligence derivation process layer 440, intelligence data associated with a user of Internet-connectable devices may be derived, managed, and updated using, for example, intelligence derivation logic 228, and stored in data repository 104 for access by ad fulfillment module 112. In some embodiments, intelligence data may be derived from raw location events data, raw network events data, and/or data derived in any one or more of the previous process layers. In some embodiments, intelligence data may comprise an audience value in which a user of an Internet-connectable device is enrolled. In some embodiments, audience values may represent segmented audiences, each segment consisting of Internet-connectable device users with similar interests, needs, characteristics, behavioral patterns, etc., that may be targeted by advertisement campaigns.

For example, two possible audience values may be "Parent" and "Health & Fitness Enthusiast." The Parent audience value may be assigned to Internet-connectable device users with, for example, an affinity to baby shops, and the Health & Fitness Enthusiast audience value may be assigned to Internet-connectable device users with, for example, an affinity to gyms and health shops. More examples of audience values may include: Affluence; Age <Age>; Art & Culture Enthusiast; Boomers; Bridal Shopper; Car Buyer; Car Buyer <Make/Model>; Car Buyer <New/Used>; Car Buyer <Vehicle Class>; DVD Enthusiast; Education Level <Level>; Environmentally Friendly; Ethnicity <Type>; Explicit Location; Gadget Geek; Gambler; Gaming Enthusiast; Gender <Male/Female>; Gym Goer; Health & Fitness Enthusiast; Home Improvement Enthusiast; Home Owner/Renter; Household Income <Amount>; IT Decision Makers; Luxury Car Buyer; Marital Status<Single/Married/Divorced>; Moms; Movie Enthusiast; Movie Enthusiast <Movie Type>; Music Enthusiast; Music Enthusiast <Music Type>; Moms <New/Expectant>; Night Life Enthusiast; Outdoors Enthusiast; Parent; Pet Owner; Restaurant Enthusiast; Restaurant Enthusiast <Cuisine Type>; Routine Place <Home/Work/School>; Shopper; Shopper <Type>; Sports Fan; Sports Fan <type>; Student; Technology Enthusiast; Teens; Traveler; Traveler <Time since last travel>; Traveler <Type>; and Traveler <Location>.

In some embodiments, audience values may have one or more respective audience value rules, which may be used by, for example, audience value resolution 441 to determine whether users of Internet-connectable devices should be enrolled into one or more audience values. In these embodiments, whether users are enrolled into an audience value may depend on various data inputs and how the various data inputs are weighted. Audience value rules are described in more detail below with reference to FIG. 5.

FIG. 8 illustrates a generic audience value rule model 800. In some embodiments, generic audience value rule models such as model 800 may be used to create unique and/or customizable audience value rules. For example, generic audience value rule models may include configurable data inputs and weight parameters. In the example of FIG. 8, generic audience value rule model 800 provides category-based, interaction-based, and related audience value-based parameters that may be adjusted to create different audience value rules.

Category-based parameters may allow for the designation of audience categories and/or audience category taxonomies that are relevant for determining whether an Internet-connectable device user qualifies for an audience value. For example, an audience value rule created for a "Health & Fitness Enthusiast" audience value using rule model 800 may have category-based parameters that include identifiers for audience categories "Gym," "VITAMIN SHOPPE," and "GNC," and/or audience category taxonomies that include audience categories "Gym," "VITAMIN SHOPPE," and "GNC."

Interaction-based parameters may allow for the consideration of different types of Internet-connectable device user interactions with relevant advertisements such as, for example, impressions, clicks, and conversions, as well as the location at which interactions occur, when determining whether the Internet-connectable device user qualifies for an audience value.

Related audience value-based parameters may allow for the designation of other audience values assigned to an Internet-connectable device user that are relevant to determining whether the Internet-connectable device user qualifies for an audience value. Related audience values may directly or indirectly influence the reference values for other audience values. For example, a "Mom" audience value may depend upon two other related audience values, the "Parent" audience value and the "Female" audience value. In this example, a user may be required to be enrolled in the "Parent" and "Female" audience values in order to be enrolled in the "Mom" audience value. The "Parent" and "Female" audience values may also have their own related audience value-based parameters, which may influence whether a user is enrolled into the "Mom" audience value.

Although only category-based, interaction-based, and related audience value-based data inputs and weights are shown in the embodiment of FIG. 8, it should be noted that many other data inputs and weights derived from, for example, raw location events data, raw network events data, and/or data derived in any one or more of the previous process layers, as described herein, may be used to determine whether a user is a good candidate for an audience value.

In certain embodiments, as shown in FIG. 8, input data may have corresponding weight values. In a particular embodiment, weight values may signify the degree of correlation between data inputs and an audience value such that a higher weight value may suggest a greater likelihood that an occurrence of a corresponding data input indicates a good candidate Internet-connectable device user for enrollment. For example, because an Internet-connectable device user that is associated with multiple "Gym" audience category occurrences may more likely belong to an audience segment represented by a "Health & Fitness Enthusiast" audience value than an Internet-connectable device user that is associated with multiple "GNC" audience category occurrences, an audience value rule created using the model of FIG. 8 may have category-based parameters that include a "Gym" audience category with a high corresponding weight and a "GNC" audience category with a comparatively low weight. In other words, an Internet-connectable device user with an affinity to only gyms may be a better candidate for a "Health & Fitness Enthusiast" audience value than an Internet-connectable device user that has an affinity to only GNC.

In a particular embodiment, audience value rules may be inclusive and/or exclusive with respect to the enrollment of users into the audience values. In this embodiment, if an audience value rule is inclusive, users that are associated with data that match, for example, any one or more, or a subset, of the data inputs of the audience value rule may be considered for enrollment. If an audience value rule is exclusive, it may be required that every data input is matched before a user is considered for enrollment.

In some embodiments, as shown in FIG. 8, data inputs may be used to derive a reference value, which may be calculated based on data inputs and weight parameters such as those described above. As specific examples, an audience value rule may calculate a reference value by examining the number of visits and the duration of those visits to a particular website; relevant audience categories and audience category taxonomies, the frequency of occurrence of the relevant audience categories and taxonomies, and any corresponding score and/or confidence value associated with the relevant audience categories and taxonomies; campaign attributes; the type of user interaction with an advertisement (e.g., click); related audience values; locations visited by a user; and/or demographics.

Demographics data may comprise, for example, affluence, gender, family size, and owner/renter data determined based on, for instance, routine place resolution 431 and reverse geocoding 425 (e.g., home location). In a particular embodiment, demographic information may be obtained with the assistance of third-party resources that may provide census and real estate data based on, for example, a provided street address.

In certain embodiments, affluence may describe, for example, the derived household income (HHI) of a user of an Internet-connectable device. In some embodiments, an Internet-connectable device user's affluence may be determined and/or adjusted based on, for example, where the user lives and/or works, which may be determined using, for example, routine place resolution 431. For instance, if a street address of an Internet-connectable device user's home falls within a neighborhood for which census data is available via a third-party resource, a median income for the neighborhood may be determined based on the value of homes in the neighborhood. In other embodiments, affluence may instead or also be determined based on other census data such as, for example, median city income. In yet other embodiments, affluence may instead or also be determined based on home value data provided by a real estate service, and/or tax assessment data. In various embodiments, one or more of the various available census and real estate data may be combined to calculate a more accurate assessment of a user's income.

In some embodiments, the affluence of a user of an Internet-connectable device may instead or also be determined and/or adjusted based on where the user shops and/or products purchased by the user, as indicated by, for example, clicks and/or conversions. It should also be noted that, in certain embodiments, affluence (e.g., derived HHI) may be adjusted for other factors including, for example, economic factors (e.g., inflation).

In some embodiments, gender of a user may be determined based on, for example, places of interest identified by place resolution 421 and/or real-world context data determined based on network events data. As a specific example, a user that consistently visits a nail salon is most likely a female while a user that consistently visits a men's clothing store is most likely a male. As another example, a user that consistently purchases makeup using an Internet-connectable device is most likely a female while a user that consistently purchases men's clothing using an Internet-connectable device is most likely a male.

In some embodiments, the size of an Internet-connectable device user's family may also be obtained based on, for example, available census and/or real estate data associated with the user's home. As another example, census data may indicate, for instance, a percentage of homes in a neighborhood that have kids and/or the average household size in a neighborhood.

In certain embodiments, whether an Internet-connectable device user is a renter or an owner may also be determined based on, for example, available census and/or real estate data associated with a user's home. For example, property records may indicate that the user's home street address corresponds to a multi-unit building. Property records may also indicate what percentage of units in the multi-unit building are rental apartments and/or what percentage of units in the multi-unit building are owned.

In certain embodiments, audience value derivation 441 may track one or more audience value reference values for each Internet-connectable device user. In some embodiments, reference values may continually be updated based on new data. For example a particular audience value may be augmented by occurrences of taxonomy IDs translated from the raw data, brand information, explicit demographic data, the type of interaction with the ad server, etc. As a specific example, an audience value rule may consider occurrences of audience categories associated with a particular application and a particular brand name. As new data for a user of an Internet-connectable device is being processed by the system (e.g., in the previous process layers), new occurrences of the audience categories may be used to augment the reference value corresponding to the audience value. If the user is not already associated with a reference value for the audience value, it may be derived.

In some embodiments, an audience value reference value corresponding to a particular Internet-connectable device may be compared to reference values for the same audience value that correspond to other Internet-connectable devices to determine if the particular Internet-connectable device should be enrolled into the audience value. In some embodiments, such comparisons may be based on reference values that are normalized to a standard 0-100 point scale. In these embodiments, enrollment in an audience value may vary over time even if the reference value remains the same as the scale may periodically change based on new intelligence data determined for other Internet-connectable devices. In certain embodiments, normalized reference values may ensure that only meaningful segments of the population are considered for enrollment in a audience value. For example, embodiments of the disclosed systems and techniques may only consider the top 25% of a sample population of users that match a "Fast Food Junkie" audience value.

Other processes that may impact audience value enrollment include, for example, confidence value derivation 442, training data 443, and confidence value depreciation 444.

In certain embodiments, a reference value may have a corresponding confidence value derived during and/or after derivation of the reference value 442. In certain embodiments, confidence values may represent the level of confidence in, for example, a user match to, or enrollment into, an audience value. In some embodiments, confidence values may be determined using probability models, which may, in some cases, be maintained and applied using a Bayes classifier.

In a particular embodiment, a probability model may hold mean and variance data for each metric that contributes to an enrollment decision. In this embodiment, as new data (e.g., real-world context data) is received and examined, the Bayes classifier may construct Gaussian probability distributions for each metric based on the data in the probability model, and then compute the joint probability of an enrollment. Based on the result, the new data may be assigned a confidence value indicating the confidence in the link between the new data and the enrollment. Examples of metrics used to calculate confidence values include duration (e.g., time spent at a location), number of impressions (e.g., the number of times an Internet-connectable device has visited the same or similar place, website, or application), distance and accuracy, place density (e.g., the number of nearby businesses), as well as other metrics.

In some embodiments, probability models are built on "training data" 443, which may include data collected during prior observations and analysis of data, as well as verified data. In some embodiments, data may be verified based on knowledge of a user (e.g., user is known and data can be personally verified), examination of the data (e.g., administrator can look at data and decide if it conclusively supports determined intelligence data), and user verification (e.g., user can verify audience values through end-user applications, such as check-ins at specific locations, and/or with location sensors). In some embodiments, once data is verified, the metrics data used to calculate a confidence value may be added to the training data. For example, if distance and accuracy are two metrics used to match a stop to a place, then when a stop-to-place link is verified the distance and accuracy data may be added to the training data.

In certain embodiments, depreciation may be applied to an audience value 444, decreasing it according to, for example, the age of the value and an audience value's depreciation rate. In some embodiments, if a confidence value for a particular user enrollment drops below a certain threshold, the user may be de-enrolled. Two example techniques that may be used include a linear decay rate that depends upon the amount of time that has passed or an incremental decay rate that examines the historical increase in enrollments at particular dates/times and decrements depreciation rates as those enrollments expire. Expiration of enrollments may be based upon a time window that varies per audience value. For example, the "Car buyer" audience value may have a much shorter depreciation window than the "Mom" audience given the transitive nature of the car buyer shopping pattern.

Within the external interfaces process layer 450, the various layers described above may be exposed to other systems. For example, audience configurations, rules, and conditions may be exposed to administrators allowing them to be changed and/or modified 451. As another example, audience values may be "published" 452 by, for instance, making the values available to ad fulfillment module 112 to be used to help drive the ad-serving process. For example, ad fulfillment module 112 may receive an ad request from a user device. In response, ad fulfillment logic 230 may select an ad for the user device based on, for example, audience values associated with the user device and campaign data. As a specific example, if the user device requesting an ad is enrolled in a "Gym" audience value, ad fulfillment logic 112 may serve a gym-related ad to the user device.

In some embodiments, audience values, as well as other Internet-connectable device data and/or user data, may be determined and/or maintained using, for example, a graph data model. For instance, in certain embodiments, a graph data model may represent the various types of data and relationships among the data, as described above, as data elements, or "nodes," connected by lines, or "edges." In these embodiments, each node may have metadata associated with the represented data and each edge may indicate a type of relationship between nodes. The various types of Internet-connectable device data represented as nodes in a graph data model may include, for example: Internet-connectable devices, location events data, network events data, event groupings, real-world context data, and/or audience values.

In some embodiments, the first node added to a graph data model may represent an Internet-connectable device. In certain embodiments, nodes representing data associated with the Internet-connectable device (e.g., data derived as described above) may subsequently be added sequentially in order of time and associated with the node representing the Internet-connectable device, and/or other nodes, by edges.

Figure 9A:
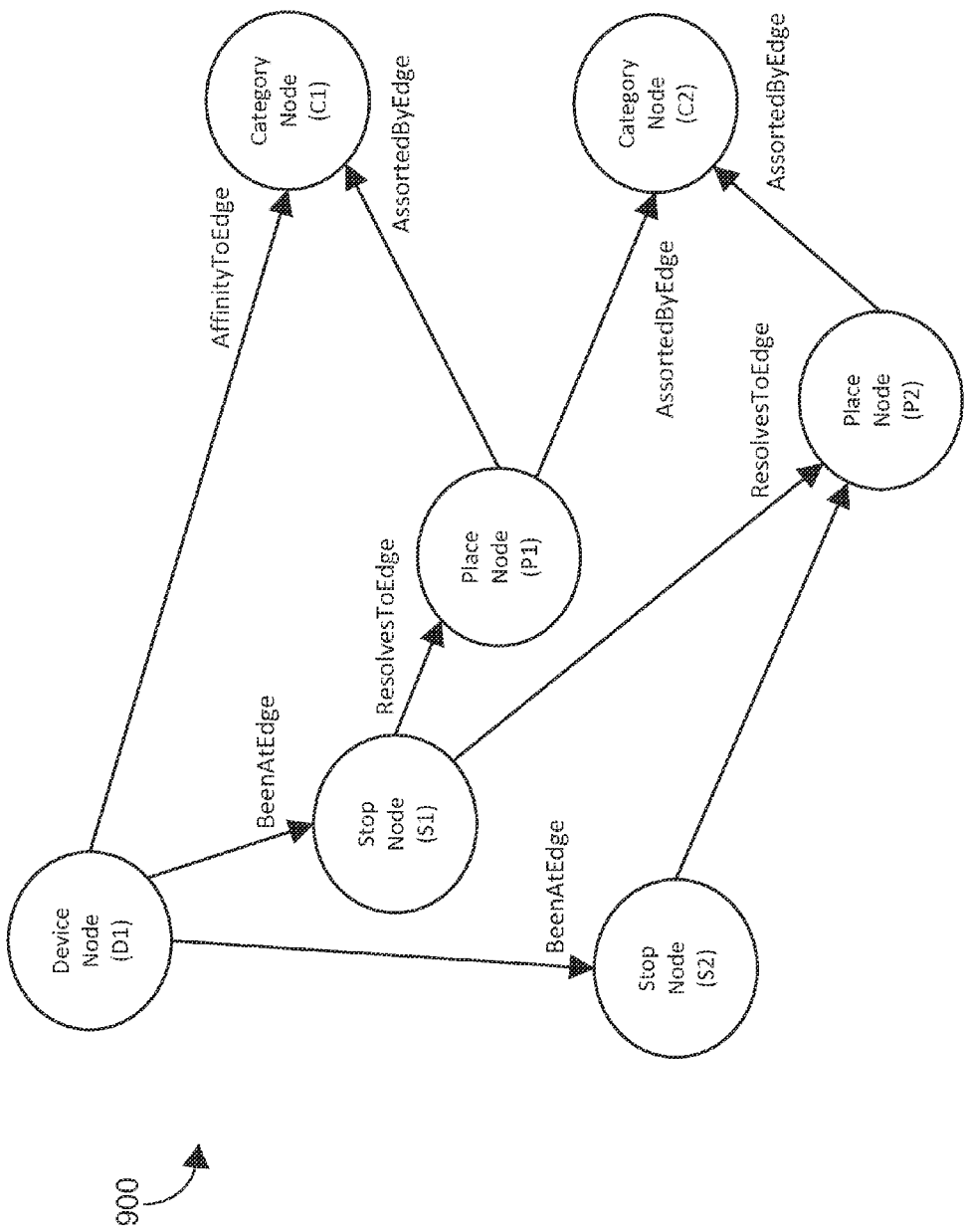
FIG. 9A illustrates a graph data model that may be used with certain embodiments of the systems and techniques described herein.

FIG. 9A shows a simplified graph data model 900 that includes nodes representing various data associated with an Internet-connectable device as well as edges representing relationships among the nodes. Device node D1, which may be the first node added to the graph data model, may represent a uniquely identified Internet-connectable device. Stop nodes S1 and S2 may represent identified stops visited by the Internet-connectable device represented by device node D1 determined using, for example, pinpoint grouping 411. In some embodiments, identified stops may be added to the graph data model sequentially in order of time. Thus, stop node S1 may represent the first stop at which the Internet-connectable device was located, and stop node S2 may represent the last stop at which the Internet-connectable device was located. The edges leading from device node D1 to stop nodes S1 and S2 may indicate a relationship between device node D1 and stop nodes S1 and S2. Specifically, each edge leading from device node D1 to a stop node indicates that the Internet-connectable device represented by device node D1 was located at the identified stop represented by each stop node.

Place nodes P1 and P2 may represent places of interest determined using, for example, place resolution 421. As described above, place resolution 421 may consider identified stops visited by an Internet-connectable device to determine a place of interest. Thus, as shown in FIG. 9A, the edges between stop node S1 and place node P1, stop node S1 and place node P2, and stop node S2 and place node P2 indicate that the stops represented by stop nodes S1 and S2 were resolved to a place represented by either place nodes P1 and/or P2.

Category nodes C1 and C2 may represent audience categories determined based on, for example, brands and/or subject matters associated with the places of interest represented by place nodes P1 and P2. For example, as shown, place node P1 was determined to correspond to the audience category represented by category node C1, and place node P2 was determined to correspond to the audience category represented by category node C2. In some embodiments, edges extending from the device node to the category nodes may be added to indicate audience category affinities.

In certain embodiments, one or more nodes and/or edges may have associated metadata. For example, stop nodes may have metadata that includes latitude/longitude coordinates; place nodes may have metadata that includes business names, street addresses, business categories and/or subcategories, business hours, and/or price structure; category nodes may have metadata including audience category type identifiers (e.g., brand or subject matter), the number of occurrences of the category node, and/or identifiers for associated audience category taxonomies; and edges may have corresponding weights and/or reference values.

In a particular embodiment, data processing logic 222, 224, 226, and/or 228, or other logic, may traverse a graph data model to determine other nodes and/or edges to be added to the graph data model based on, for example, one or more rules. For example, data processing logic 222, 224, 226, and/or 228 may examine metadata associated with nodes and/or edges of a graph data model to determine other nodes and/or edges to be added to the graph data model. An example of how data processing logic 222, 224, 226, and/or 228 may traverse a graph data model to determine other nodes and/or edges to be added to the graph data model is further described below with reference to FIG. 9B.

FIG. 9B illustrates the determination and addition of other nodes and edges to graph data model 900 beginning with the addition of stop node S3—the latest location visited by the Internet-connectable device represented by device node D1. In these embodiments, data processing logic 222, 224, 226, and/or 228 may examine stop node S3 and determine that a relationship exists between stop node S3 and place node P2. The relationship is represented in graph data model 900 as an edge between stop node S3 and place node P2. The additional visit to the place of interest represented by place node P2, which is associated with the audience category represented by category node C2, may result in the satisfaction of an audience category affinity rule that exists for the audience category represented by category Node C2. As a result, data processing logic 222, 224, 226, and/or 228 may determine that a user of the Internet-connectable device represented by device node D1 has an affinity to the audience category represented by category node C2, which may be indicated in graph data model 900 by adding an edge between device node D1 and category node C2. By determining that a user affinity to the audience category represented by category node C2 exists, it may also be determined that an audience value rule is satisfied, which may be indicated by the addition of audience value node AV1, the edge between category node C2 and audience value node AV1, and the edge between device node D1 and audience value node AV1 to graph data model 900.

The foregoing description of the systems and techniques, along with associated embodiments, has been presented for purposes of illustration only. It is not exhaustive and does not limit the techniques to the precise form disclosed. Those skilled in the art will appreciate from the foregoing description that modifications and variations are possible in light of the above teachings or may be acquired from practicing the techniques. For example, the steps described need not be performed in the same sequence discussed or with the same degree of separation. Likewise, various steps may be omitted, repeated, or combined, as necessary, to achieve the same or similar objectives. Accordingly, the spirit and scope of the systems and techniques described herein should be limited only by the following claims.

What is claimed is:

1. A computer system for providing mobile advertising using data networks based on groupings associated with Internet-connectable devices, the computer system comprising:

a processor; and a memory coupled to the processor, the memory storing instructions to cause the processor to perform operations comprising:

receiving from an Internet-connectable device two location events captured by the Internet-connectable device, wherein each of the two location events represents a respective previous geographical location of the Internet-connectable device;

grouping the two location events into a location events group based on a proximity of the two location events;

determining a place of interest of a user of the Internet-connectable device based on the location events group;

determining an audience category associated with the place of interest, wherein the audience category represents a brand or subject matter of a brand associated with the place of interest;

determining an audience segment to which a user of the Internet-connectable device belongs based on the audience category, wherein the audience segment comprises a group of Internet-connectable device users defined based on at least one criterion common among the group of Internet-connectable device users; and transmitting an advertisement to the Internet-connectable device, wherein the advertisement is determined based on the audience segment.

2. The computer system of claim 1, wherein grouping the two location events into a location events group based on a proximity of the two location events comprises:

determining an intersection of the first geometric circle associated with one of the two location events and a second geometric circle associated with the other one of the two location events, wherein the first geometric circle has a radius equal to a geographical accuracy of the one of the two location events and the second geometric circle has a radius equal to a geographical accuracy of the other one of the tow location events;

determining a geometric bounding box around the intersection;

determining a center of the geometric bounding box; and determining a geometric grouping circle with a center equal to the center of the geometric bounding box and a radius equal to a longest length from the center of the geometric bounding box to an edge of the geometric bounding box.

3. The computer system of claim 1, wherein grouping the two location events into a location events group based on a proximity of the two location events comprises:

determining a geometric ellipse based on a union of the first geometric circle associated with one of the two location events and a second geometric circle associated with the other one of the two location events, wherein the first geometric circle has a radius equal to a geographical accuracy of the one of the two location events and the second geometric circle has a radius equal to a geographical accuracy of the other one of the two location events; and determining a geometric grouping circle with a center equal to a center of the geometric ellipse and a radius equal to a major radius of the geometric ellipse.

4. The computer system of claim 1, wherein the processor is further caused to perform the operation of:

determining a time period associated with the location events group based on a difference between a first timestamp associated with one of the two location events and a second timestamp associated with the other one of the two location events; and comparing the time period against a threshold to determine whether the location events group should be discarded.

5. The computer system of claim 1, wherein determining the audience segment to which the user of the Internet-connectable device belongs is also based on a determined routine route traveled by the user of the Internet-connectable device.

6. The computer system of claim 1, wherein determining the audience segment to which the user of the Internet-connectable device belongs is also based on at least one network event.

7. The computer system of claim 1, wherein the processor is further caused to perform the operation of:

grouping a third location event into the location events group.

8. A computer system for providing mobile advertising using data networks based on groupings associated with Internet-connectable devices, the computer system comprising:

a processor; and a memory coupled to the processor, the memory storing instructions to cause the processor to perform operations comprising:

capturing two network events, wherein each of the two network events is associated with a respective advertisement communicated to an Internet-connectable device;

grouping the two network events into a network events group based on a determination that the two network events are associated with an individual network session;

determining an audience category based on network events group, wherein the audience category represents a brand or subject matter of a brand associated with the network events group;

determining an audience segment to which a user of the Internet-connectable device belongs based on the audience category, wherein the audience segment comprises a group of Internet-connectable device users defined based on at least one criterion common among the group of Internet-connectable device users; and transmitting an additional advertisement to the Internet-connectable device, wherein the advertisement is determined based on the audience segment.

9. The computer system of claim 8, wherein the individual network session is an individual website session.

10. The computer system of claim 8, wherein the individual network session is an individual application session.

11. A computer-implemented method for providing mobile advertising using data networks based on grouping associated with Internet-connectable devices, the method comprising:

receiving from an Internet-connectable device a first set of location events captured by the Internet-connectable device, wherein each location event in the first set of location events represents a respective previous geographical location of the Internet-connectable device;

grouping the first set of location events into a first location events group based on a proximity of the location events in the first set of location events, wherein the first location events group represents a first stop at which the Internet connectable device was located;

receiving from the Internet-connectable device a second set of location events captured by the Internet-connectable device, wherein each location event in the second set of location events represents a respective previous geographical location of the Internet-connectable device;

grouping the second set of location events into a second location events group based on a proximity of the location events in the second set of location events, wherein the second location events group represents a second stop at which the Internet-connectable device was located;

determining, using a processor, a routine place associated with the Internet-connectable device based on a determination that the first stop occurred within a first time window and the second stop occurred within a second time window;

determining a demographic of a user of the Internet-connectable device based on the routine place;

determining an audience segment to which the user of the Internet-connectable device belongs based on the demographic, wherein the audience segment comprising a group of Internet-connectable device users defined based on at least one criterion common among the group of Internet-connectable device users; and transmitting an advertisement to the Internet-connectable device, wherein the advertisement is determined based on the audience segment.

12. The method of claim 11, wherein the routine place is further determined based on an amount of time the Internet-connectable device is located at the first stop within the first time window.

13. The method of claim 11, wherein the routine place corresponds to a home of the user of the Internet-connectable device.

14. The method of claim 11, wherein demographic is affluence.

15. The method of claim 11, wherein the routine place corresponds to a work location of the user of the Internet-connectable device.

16. The method of claim 11, wherein grouping the first set of location events comprises:
    determining an intersection of the first geometric circle associated with a first location event in the first set of location events and a second geometric circle associated with a second location event in the first set of location events, wherein the first geometric circle has a radius equal to a geographical accuracy of the first location event in the first set of location events and the second geometric circle has a radius equal to a geographical accuracy of the second location event in the first set of location events;
    determining a geometric bounded box around the intersection;
    determining a center of the geometric bounding box; and
    determining a geometric grouping circle with a center equal the center of the geometric bounding box and a radius equal to a longest length from the center of the geometric bounding box to an edge of the geometric bounding box.

17. The method of claim 11, wherein grouping the first of location events comprises:
    determining a geometric ellipse based on a union of the first geometric circle associated with a first location event in the first set of location events and a second geometric circle associated with a second location event in the first set of location events, wherein the first geometric circle has a radius equal to a geographical accuracy of the first location event in the first set of location events and the second geometric circle has a radius equal to a geographical accuracy of the second location event in the first set of location events; and
    determining a geometric grouping circle with a center equal to a center of the geometric ellipse and a radius equal to a major radius of the geometric ellipse.

18. The method of claim 11, further comprising:
    determining an amount of time at which the Internet-connectable device was located at the first stop based on a different a timestamp associated with a first location event in the first set of location events and a timestamp associated with a second location event in the first set of location events; and
    comparing the amount of time against a threshold to determine whether the first stop should be discarded.

19. A computer-implemented method for providing mobile advertising using data networks based on groupings associated with Internet-connectable devices, the method comprising:
    receiving from an Internet-connectable device a first set of location events captured by the Internet-connectable device, wherein each location event in the first set of location events represents a respective previous geographical location of the Internet-connectable device;
    grouping the first set of location events into a first location events group based on a proximity of the location events in the first set of location events, where the first location events group represents a first stop at which the internet-connectable device was located;
    receiving from the Internet-connectable device a second set of location events captured by the Internet-connectable device, wherein each location event in the second set of location events represents a respective previous geographical location of the Internet-connectable device;
    grouping the second set of location events into a second location events group based on a proximity of the location events in the second set of location events, where the second location events group represents a second stop at which the Internet-connectable device was located;
    determining, using a processor, a routine place corresponding to where a user of the Internet-connectable device lives based on a determination that the first stop occurred within a first time window and the second stop occurred within a second time window, wherein the first time window and the second time window correspond to a previously determined time of day;
    determining a home area based on at least the routine place corresponding to the home of the user;
    determining a visited area outside of the home area;
    determining an audience segment to which the user of the Internet-connectable device belongs based on the visited area, wherein the audience segment comprises a group of Internet-connectable device users defined based on at least one criterion common among the group of Internet-connectable device users; and
    transmitting an advertisement to the Internet-connectable device, wherein the advertisement is determined based on the audience segment.

20. The method of claim 19, wherein determining the visited area depends on a continuous period of time the Internet-connectable device is located at the visited area.

21. The Method of claim 19, wherein determining the visited area depends on a frequency of overnight stays in the visited area.

22. The method of claim 19, wherein the home area is further determined based on a routine place corresponding to where the user of the Internet-connectable device works.

* * * * *

UNITED STATES PATENT AND TRADEMARK OFFICE
CERTIFICATE OF CORRECTION

PATENT NO. : 8,521,593 B2  
APPLICATION NO. : 13/605613  
DATED : August 27, 2013  
INVENTOR(S) : Hemang N. Gadhia et al.

Page 1 of 1

It is certified that error appears in the above-identified patent and that said Letters Patent is hereby corrected as shown below:

In the Claims

Claim 14, Col. 29, Line 11, "demographic" should read as --the demographic--.

Claim 21, Col. 30, Line 50, "Method" should read as --method--.

Signed and Sealed this  
Twenty-second Day of October, 2013

Teresa Stanek Rea  
*Deputy Director of the United States Patent and Trademark Office*